United States Patent
Wingender et al.

(10) Patent No.: US 10,814,854 B2
(45) Date of Patent: Oct. 27, 2020

(54) ASSEMBLY HAVING A BRAKE CYLINDER AND AN ELECTROMECHANICAL BRAKE BOOSTER

(71) Applicants: Lucas Automotive GmbH, Koblenz (DE); ZF Friedrichshafen AG, Friedrichshafen (DE)

(72) Inventors: Kurt Wingender, Hartenfels (DE); Martin Hofmann, Mendig (DE); Boris Koeth, Weitersburg (DE); Jose Manuel Calvo Martinez, Kruft (DE); Jens Sparfeld, Miehlen (DE); Stefan Kammers, Oberstadtfeld (DE); Paul Warkentin, Neuwied (DE); Ingo Decker, Friedrichshafen (DE); Klemens Humm, Immenstaad (DE); Detlef Baasch, Oberteuringen (DE)

(73) Assignees: ZF Active Safety GmbH, Koblenz (DE); ZF Friedrichshafen AG, Friedrichshafen (DE)

( * ) Notice: Subject to any disclaimer, the term of this patent is extended or adjusted under 35 U.S.C. 154(b) by 97 days.

(21) Appl. No.: 15/761,091

(22) PCT Filed: Sep. 16, 2016

(86) PCT No.: PCT/EP2016/072054
§ 371 (c)(1),
(2) Date: Mar. 17, 2018

(87) PCT Pub. No.: WO2017/046381
PCT Pub. Date: Mar. 23, 2017

(65) Prior Publication Data
US 2018/0273011 A1    Sep. 27, 2018

(30) Foreign Application Priority Data
Sep. 17, 2015 (DE) ......................... 10 2015 012 125

(51) Int. Cl.
*B60T 13/74* (2006.01)
*F16H 1/22* (2006.01)
*F16H 19/04* (2006.01)

(52) U.S. Cl.
CPC .......... *B60T 13/746* (2013.01); *B60T 13/745* (2013.01); *F16H 1/22* (2013.01); *F16H 19/04* (2013.01)

(58) Field of Classification Search
CPC ........ B60T 13/745; B60T 13/746; F16H 1/22; F16H 19/04; F16D 2125/24
See application file for complete search history.

(56) References Cited

U.S. PATENT DOCUMENTS 4,395,883 A * 8/1983 Melinat ................. B60T 13/745
  60/545
5,875,681 A   3/1999 Gerrand et al.
(Continued)

FOREIGN PATENT DOCUMENTS

DE      10009390 A1    9/2001
DE   102009001142 A1   8/2010
(Continued)

OTHER PUBLICATIONS

PCT International Search Report and the Written Opinion, Application No. PCT/EP2016/072054 filed Sep. 16, 2016, dated Nov. 15, 2016.
(Continued)

*Primary Examiner* — Xuan Lan Nguyen
(74) *Attorney, Agent, or Firm* — Gigette M. Bejin

(57) ABSTRACT

The invention relates to an assembly for a vehicle brake system, which comprises at least one brake cylinder and an electromechanical brake booster, having a drive arrangement for driving at least one actuating device designed for actuating a brake cylinder, wherein the drive arrangement
(Continued)

has at least one electric motor and a gear mechanism for coupling the electric motor to the at least one actuating device, wherein at least one fastening device is provided for fastening the assembly to a vehicle, said fastening device defining a fastening plane. According to the invention the rotary shaft of the electric motor is arranged perpendicular to the longitudinal axis of the actuating device and at an angle of between 60° and 120° to the fastening plane.

23 Claims, 25 Drawing Sheets

(56) References Cited

U.S. PATENT DOCUMENTS

| | | | |
|---|---|---|---|
| 6,404,084 B1 * | 6/2002 | Niki | H02K 7/1166 310/68 B |
| 7,581,714 B2 | 9/2009 | Machu | |
| 8,997,482 B2 * | 4/2015 | Richard | B60T 13/745 60/545 |
| 9,139,186 B2 | 9/2015 | Vollert et al. | |
| 9,650,028 B2 | 5/2017 | Cagnac | |
| 2014/0208894 A1 | 7/2014 | Miller | |
| 2015/0197231 A1 | 7/2015 | Winkler et al. | |
| 2015/0308527 A1 | 10/2015 | Nagel et al. | |
| 2018/0257618 A1 * | 9/2018 | Wingender | B60T 13/745 |
| 2018/0257619 A1 * | 9/2018 | Wingender | B60T 13/745 |

FOREIGN PATENT DOCUMENTS

| | | |
|---|---|---|
| DE | 102011080979 A1 | 1/2013 |
| DE | 102012014361 A1 | 1/2014 |
| DE | 102013007574 A1 | 11/2014 |
| DE | 102013217745 A1 | 3/2015 |
| EP | 0792779 A1 | 9/1997 |
| EP | 2292483 A1 | 3/2011 |
| EP | 2420421 A1 | 2/2012 |
| EP | 2465741 A1 | 6/2012 |
| EP | 2781779 A1 | 9/2014 |
| WO | 2006/079759 A1 | 8/2006 |
| WO | 2011/003643 A1 | 1/2011 |
| WO | 2011/026804 A1 | 3/2011 |
| WO | 2011026804 A1 | 3/2011 |
| WO | 2011036343 A1 | 3/2011 |
| WO | 2014/012702 A1 | 1/2014 |
| WO | 2014012702 A1 | 1/2014 |
| WO | 2014/090468 A1 | 6/2014 |
| WO | 2014/177691 A1 | 11/2014 |

OTHER PUBLICATIONS

PCT International Preliminary Report on Patentability, Application No. PCT/EP2016/072054 filed Sep. 16, 2016, dated Oct. 27, 2017.

* cited by examiner

ASSEMBLY HAVING A BRAKE CYLINDER AND AN ELECTROMECHANICAL BRAKE BOOSTER

CROSS-REFERENCE TO RELATED APPLICATIONS

This application is the National Phase of International Application PCT/EP2016/072054 filed Sep. 16, 2016 which designated the U.S. and that International Application was published in English under PCT Article 21(2) on Mar. 23, 2017 as International Publication Number WO 2017/046381 A1. PCT/EP2016/072054 claims priority to German Application No. 10 2015 012 125.1, filed Sep. 17, 2015. Thus, the subject nonprovisional application claims priority to DE 10 2015 012 125.1, filed Sep. 17, 2015. The disclosures of both applications are incorporated herein by reference.

BACKGROUND OF THE INVENTION

The present disclosure relates generally to the technical field of electrohydraulic brake force generating devices. It relates in particular to an assembly having a brake cylinder and having an electromechanical brake booster which can be used in an electrohydraulic vehicle brake system.

Electromechanical brake boosters are driven by electric motors. To be able to effect boosting of the brake force by means of the electromechanical brake booster, the rotational movement of the output shaft of the electric motor must be converted into a translational movement. Various devices are known for this purpose from the prior art.

WO 2014/012702 A1 discloses an actuating device for a master brake cylinder. The actuating device comprises a housing, through which a pressure element for actuating an actuating piston of the master brake cylinder extends, an electric motor, and a worm which is driven by the electric motor and which crosses the pressure element.

Document WO 2011/003643 discloses a force transmission arrangement. The force transmission arrangement has an electric motor which drives a worm shaft. A worm toothing is formed on the worm shaft. The force transmission arrangement furthermore comprises a first worm gear, a second worm gear, a first pinion and a second pinion. A toothed rack has a first tooth row and a second tooth row. The longitudinal axis of the toothed rack runs parallel to the axis of the worm shaft. The first pinion meshes with the first tooth row and the second pinion meshes with the second tooth row. The first pinion is connected to the first worm gear, such that the first worm gear and the first pinion rotate conjointly. In the same way, the second worm gear is connected to the second pinion. The first worm gear and the second worm gear are driven conjointly by the worm toothing on the worm shaft.

Also known from the prior art is an electromechanical brake booster which is disclosed in document EP 2 420 421 A1. The electromechanical brake booster has an electric motor, a thrust rod and a drive device for driving the thrust rod. A drive shaft of the electric motor drives a first toothed gear with an external toothing and a second toothed gear with an internal toothing. The first toothed gear drives a first gear mechanism gear and the second toothed gear drives a second gear mechanism gear. The first gear mechanism gear and the second gear mechanism gear engage into a toothing on the thrust rod for the purposes of driving the thrust rod in translation.

Owing to their construction or their complex design, the devices known from the prior art are relatively large in terms of structure. The devices known from the prior art take up a relatively large amount of structural space in a vehicle. This is the case in particular if said devices must be attached to the fastening points which are provided in a vehicle and which are normally predefined by the vehicle manufacturers.

SUMMARY OF THE INVENTION

It is sought to specify an assembly having a brake cylinder and having an electromechanical brake booster with a reduced structural space requirement and with an improved and structural-space-saving alignment with respect to the fastening points provided in a vehicle.

The assembly having a brake cylinder and an electromechanical brake booster for a vehicle brake system comprises a drive arrangement for driving at least one actuating device designed for actuating the brake cylinder. The drive arrangement has at least one electric motor and a gear mechanism for coupling the electric motor to the at least one actuating device. At least one fastening device is provided for fastening the assembly to a vehicle. The at least one fastening device defines a fastening plane. The drive arrangement is arranged such that the axis of rotation of the electric motor runs perpendicular to the longitudinal axis of the actuating device and at an angle of 60° to 120° with respect to the fastening plane.

The axis of rotation of the electric motor, running perpendicular to the longitudinal axis of the actuating device, may intersect or be arranged offset with respect to the longitudinal axis of the actuating device. For example, the axis of rotation of the electric motor may be arranged offset with respect to the longitudinal axis of the actuating device, and may extend in a plane running perpendicular to the longitudinal axis of the actuating device.

The axis of rotation of the electric motor may run perpendicular to the fastening plane. The electric motor can be arranged as close as possible to the actuating device which is driven by said electric motor, whereby a compact and structural-space-saving construction of the electromechanical brake booster is realized. The arrangement of the drive arrangement of the electromechanical brake booster at an angle of 60° to 120° relative to the fastening plane defined by the fastening device permits improved utilization of the structural space present in the vehicle, which is also determined by the fastening points provided or predefined in a vehicle. The drive arrangement may in this case be aligned, and arranged with its units, such that the structural space present in a vehicle with respect to the predefined fastening points can be utilized to the best possible extent.

Regardless of whether or not the brake booster is installed in the vehicle, the axis of rotation of the electric motor runs at an angle of 60 to 120° with respect to the fastening plane defined by the at least one fastening device. By contrast to this, the axis of rotation of the electric motor may extend at any conceivable angle with respect to the vertical axis of the vehicle. The axis of rotation of the electric motor may for example also extend at an angle of 0° with respect to the vertical axis of the vehicle, and thus run parallel to the vertical axis. The axis of rotation of the electric motor may also run at an angle of 45° or 135° with respect to the vertical axis of the vehicle, to give further examples.

In the state in which the brake booster is fitted in the vehicle, the fastening plane runs at a predetermined angle or obliquely with respect to the vertical axis of the vehicle.

The longitudinal axis of the at least one actuating device and/or of the brake cylinder may lie in said fastening plane.

Here, the gear mechanism is configured such that the rotational movement of the output shaft of the electric motor is converted into a translational movement of the actuating device. A brake force can be generated by means of the translational movement of the actuating device in the direction of the brake cylinder.

The drive arrangement may have a control unit which is designed for actuating the at least one electric motor. The at least one control unit may have a sensor arrangement or be connected to a sensor arrangement. The sensor arrangement may for example be configured to make it possible to determine the required boosting of the braking force exerted on the brake pedal. Based on the measurement values from the sensor arrangement, it is then possible to determine the boosting force that must be provided in particular by the electric motor via the gear mechanism. The measurement values detected by the sensor arrangement thus provide an indicator for the boosting force that must be generated by the electric motor together with the gear mechanism and transmitted to the at least one actuating device. Individual sensors of the sensor arrangement may be integrated into the electric motor and/or the control unit. The boosting force to be provided by the electromechanical brake booster may be dependent on a driver braking demand detected by the sensor arrangement or on commands from a driving dynamics regulation program. The braking demand can be detected by means of the at least one sensor arrangement and converted by the at least one control unit into corresponding drive signals for the electric motor. The braking demand may be determined for example by detection of a brake pedal travel and/or of a pedal actuation force acting on the brake pedal. One or more driving dynamics regulation programs, such as for example an anti-lock system (ABS), a drive slip regulator (ASR), an electronic stability program (ESP), may be stored in the control unit.

The actuating device may comprise at least one actuating unit or at least one first actuating element which can be acted on with a pedal actuation force exerted on a brake pedal. Aside from the actuating unit or the first actuating element, the actuating device may have at least one further actuating element or a second actuating element, which is driven by the electric motor via the gear mechanism. The at least one first actuating element may be accommodated at least in sections in the second actuating element. The first actuating element and the second actuating element may interact for the purposes of transmitting a braking force to the brake cylinder. In this case, it may be provided that at least a part of the braking force exerted on the first actuating element by the brake pedal is transmitted directly to the brake cylinder. The electric motor can be actuated by the control unit on the basis of the detected braking force demanded by the driver using the brake pedal. The electric motor can, via the gear mechanism, displace the second actuating element in the direction of the brake cylinder for the purposes of generating a boosting force. The first actuating element and the second actuating element are displaced in the direction of the brake cylinder in order, by means of the brake cylinder, to generate a brake pressure at the wheel brakes.

Depending on the structural space available in the vehicle, the units of the drive arrangement, such as gear mechanism, electric motor or also the control unit, may be arranged on different sides of the actuating device. This equates to an arrangement of individual units on different sides of the fastening plane, because the longitudinal axis of the actuating device lies in the fastening plane. Regardless of the distribution of the units of the drive arrangement on the two sides of the actuating device or of the fastening plane, the units of the drive arrangement are nevertheless arranged at the angle, defined by the axis of rotation of the electric motor, relative to the vertical axis of the vehicle. Different distributions of the units of the drive arrangement are conceivable. The gear mechanism, the electric motor and the control unit may be arranged together on one side of the fastening plane or of the actuating device. Alternatively, the electric motor and the control unit may be arranged together on one side of the actuating device. In this case, the gear mechanism may be arranged on the other side of the actuating device. It is furthermore conceivable for the gear mechanism and the control unit to be arranged together on one side of the actuating device and for the electric motor to be arranged on the other side of the actuating device. It is also possible for the electric motor and the gear mechanism to be arranged together on one side of the actuating device, whereas the control unit is arranged on the other side of the fastening plane.

The at least one fastening device may have fastening means which define the fastening plane. The fastening means may have fastening openings or fastening bolts, the central axes of which span the fastening plane. The fastening device may be formed by a flange and by the fastening bolts which are received in sections in openings in the flange. The fastening bolts may be secured on the flange by means of nuts. The fastening bolts may extend parallel to the longitudinal axis of the actuating device. In a vehicle, fastening points are provided for the attachment of the assembly to a brake booster and to a brake cylinder. The fastening bolts of the assembly formed by the electromechanical brake booster and the brake cylinder may be inserted into openings at the predefined fastening points on a bulkhead. The fastening bolts may be secured from the passenger compartment with nuts, and thereby fastened to the bulkhead. Said fastening points are normally predefined by the vehicle manufacturers. The fastening device may be arranged on the at least one brake cylinder. The fastening device may also be arranged on the electromechanical brake booster. The fastening device may for example be connected to the vehicle by means of fastening bolts, and thereby attached to the vehicle.

The at least one actuating device may have at least one toothed rack section. The at least one toothed rack section may be provided on the second actuating element, because it is sought for primarily the second actuating element to be driven by the gear mechanism. On the at least one actuating device there may be provided a first toothed rack section and a second toothed rack section, which are couplable to the gear mechanism.

The gear mechanism may have at least one first spur gear and at least one second spur gear. A spur gear is to be understood to mean a toothed gear with a toothing on its outer circumference. The spur gears may be coupled to the at least one toothed rack section. Here, the first toothed rack section may be coupled to the first spur gear, and the second toothed rack section may be coupled to the second spur gear. Each spur gear may be coupled by means of a shaft, and a toothed gear arranged thereon, to one of the toothed rack sections. The two toothed rack sections may be provided on opposite sides of the actuating device.

The first spur gear may be driven directly by means of a pinion on the output shaft of the electric motor. An intermediate toothed gear—hereinafter referred to as "intermediate gear"—driven by the pinion of the electric motor may be provided for driving the second spur gear. The second spur gear is thus driven not directly by the electric motor but via the intermediate gear. The intermediate gear may likewise be formed in the manner of a spur gear, that is to say the intermediate gear may have an external toothing. With the intermediate gear, it is achieved that the direction of rotation of the second spur gear is reversed. The first spur gear and the second spur gear thus rotate in the same direction. The first and the second spur gear can be arranged on opposite sides of the actuating device for the purposes of driving the latter.

Furthermore, the gear mechanism may have an intermediate gear mechanism stage. The intermediate gear mechanism stage may couple the electric motor to the first spur gear and to the second spur gear in torque-transmitting fashion. The intermediate gear mechanism stage drives the first spur gear directly and the second spur gear via the at least one intermediate gear.

The intermediate gear mechanism stage may have at least one first toothed gear and at least one second toothed gear which is coaxial with respect to the first toothed gear. The first toothed gear and the second toothed gear may be formed in the manner of spur gears. The first toothed gear and the second toothed gear may be connected rotationally conjointly to one another. The first toothed gear may have a larger diameter than the second toothed gear. Since the second toothed gear may have a smaller diameter than the first toothed gear, the intermediate gear mechanism stage can provide a speed reduction. The first toothed gear and the second toothed gear define an axis of rotation of the intermediate gear mechanism stage. The axis of rotation of the intermediate gear mechanism stage may extend perpendicular to the longitudinal axis of the actuating device.

The gear mechanism may have an input toothed gear which is driven by the electric motor. The input toothed gear may drive the first toothed gear of the intermediate gear mechanism stage. The first toothed gear of the intermediate gear mechanism stage may be directly in torque-transmitting engagement with the input toothed gear of the gear mechanism. The torque which is generated by the electric motor and which drives the input toothed gear can be transmitted directly from the input toothed gear to the first toothed gear of the intermediate gear mechanism stage.

The second toothed gear may drive the first spur gear directly and the second spur gear via the at least one intermediate gear. The second toothed gear may be in direct torque-transmitting engagement both with the first spur gear and with the intermediate gear. The intermediate gear, which is driven by the second toothed gear, may be in torque-transmitting engagement with the second spur gear. The intermediate gear drives the second spur gear in the opposite direction to the direction of rotation of the first spur gear.

The intermediate gear mechanism unit may be formed as a spur gear mechanism. The first toothed gear and the at least one second toothed gear arranged coaxially with respect to the first toothed gear of the intermediate gear mechanism unit may be formed in the manner of a double toothed gear. Said double toothed gear may define the axis of rotation of the intermediate gear mechanism unit.

The first toothed gear of the intermediate gear mechanism stage may be arranged offset, in the direction of the axis of rotation of the electric motor, with respect to the second toothed gear of the intermediate gear mechanism stage, with respect to the first spur gear and with respect to the second spur gear. The input toothed gear and the first toothed gear of the intermediate gear mechanism stage may be arranged, in the direction of the axis of rotation of the electric motor, in a first plane. The second toothed gear, the first spur gear, the intermediate gear and the second spur gear may be arranged, in the direction of the axis of rotation of the electric motor, in a second plane. The first plane and the second plane may be arranged offset with respect to one another in the direction of the axis of rotation of the electric motor. By means of the intermediate gear mechanism stage with its two toothed gears, a torque-transmitting connection can be produced between the first plane and the second plane.

The brake booster may have a clutch. The clutch may be provided between the electric motor and the gear mechanism. The clutch may couple the output shaft of the electric motor to an input shaft of the gear mechanism. By means of the clutch, overload damage owing to an excessively high torque at the electric motor and/or at the gear mechanism can be prevented. High torques may arise for example when the electric motor begins to drive the gear mechanism or when the motor ends the drive of the gear mechanism. The clutch may be formed in the manner of a dog clutch. The output shaft of the motor and the input shaft of the gear mechanism may be assigned in each case one clutch part of the clutch. The clutch parts may have projections which protrude in the direction of the axis of rotation of the electric motor and which can be placed in engagement with one another for the transmission of torque. The clutch may furthermore have an intermediate piece which is arranged between the two clutch parts. The intermediate piece may be of substantially stellate form. The intermediate piece may have a multiplicity of arms which extend away from a central region of the intermediate piece. The intermediate piece may be designed such that in each case one arm of the intermediate piece is situated between the projections of the two clutch parts. The intermediate piece may be produced from an elastic or flexible material. The input toothed gear which is driven by the electric motor may be provided on the input shaft of the gear mechanism. By means of the clutch, the mounting and dismounting of the electric motor on and from the brake booster or the actuating device can be simplified. The electric motor, with the housing part assigned thereto, forms a module which, by means of the clutch, can be quickly and easily detached from and connected to the gear mechanism.

The electromechanical brake booster may have a multi-part housing. The gear mechanism may be assigned at least one housing part. Further housing parts can be assigned for example to the actuating device and the electric motor. The input shaft of the gear mechanism may be mounted on that housing part which is assigned to the gear mechanism. A corresponding bearing point for the input shaft may be formed on the housing part. The input shaft may be mounted on the bearing point of the housing part by means of a bearing element. Furthermore, the intermediate gear mechanism stage may be mounted on the housing part. The intermediate gear mechanism stage may have a shaft section on which a bearing element may be arranged. The shaft section may extend along the axis of rotation of the intermediate gear mechanism stage. A bearing point for the bearing element of the intermediate gear mechanism stage may be formed on the housing part. Rolling bearings may be used as bearing elements. For example, ball bearings or needle-roller bearings may be used for the mounting of the input shaft and/or of the intermediate gear mechanism stage.

A further aspect is an electrohydraulic motor vehicle brake system having an electromechanical brake booster of the type described above.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is pointed out that, in the figures described below, the toothing of the individual toothed gears, toothed racks etc. is in part illustrated merely schematically. It is self-evident that, in each case, a suitable toothing is provided, which may for example also be formed as a helical toothing, in order to permit meshing of the individual gear mechanism elements with one another.

Figure 1:
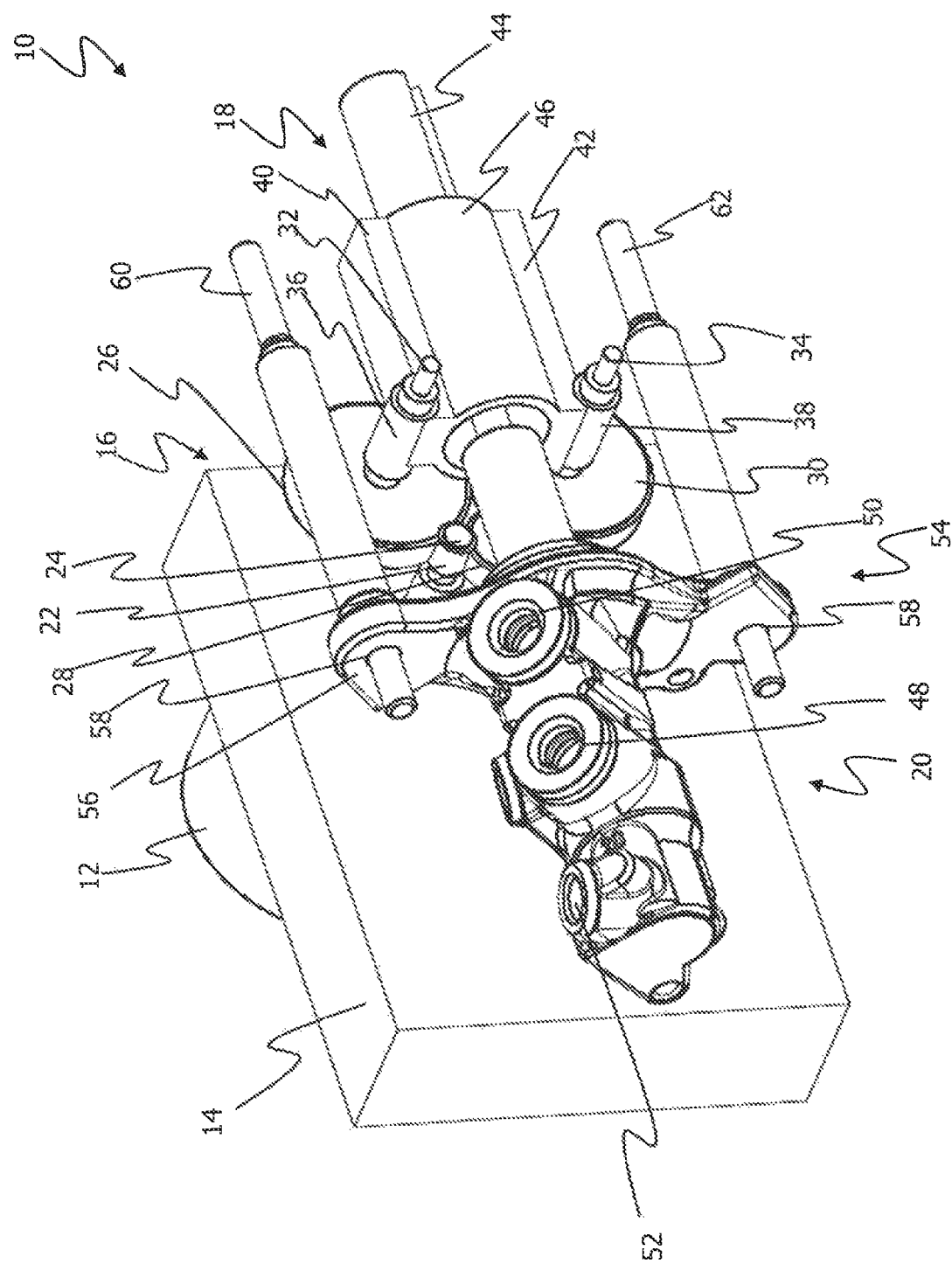
FIG. 1 shows a perspective view of an electromechanical brake booster according to an exemplary embodiment.

FIG. 1 shows a perspective view of an electromechanical brake booster, which is denoted generally by 10.

The electromechanical brake booster 10 comprises a motor 12, a control unit 14, a gear mechanism 16 and an actuating device 18. The actuating device 18 is coupled to a brake cylinder 20. The electromechanical brake booster 10 and the brake cylinder 20 form an assembly.

A pinion 24 is provided on an output shaft 22 of the electric motor 12. The pinion 24 directly drives a first spur gear 26 and an intermediate gear 28. A second spur gear 30 is driven via the intermediate gear 28.

The spur gears 26 and 30 drive in each case one shaft 32, 34. On the shafts 32 and 34 there is provided in each case one toothed gear or one toothed roller 36, 38. The toothed gears 36 and 38 are in engagement in each case with a toothed rack section 40, 42 on the actuating device 18. The toothed rack sections 40, 42 are arranged on opposite sides of the actuating device 18. The respective toothing of said gear mechanism elements 24, 26, 28, 30, 36, 38, 40, 42 is illustrated merely schematically.

The actuating device 18 has a first actuating element 44 and a second actuating element 46. Provided on the second actuating element 46 are the toothed rack sections 40, 42, which engage with the toothed gears 36, 38. The first actuating element 44 can be acted on with a braking force exerted on a brake pedal by a driver of the vehicle. This causes the first actuating element 44 to be moved in the direction of the brake cylinder 20. The boosting force demanded by the driver is generated by the actuating device 18, which is driven by the electric motor 12 via the gear mechanism 16.

For this purpose, the second actuating element 46 is moved by the electric motor 20, via the gear mechanism 16 and in particular via the toothed gears 36, 38 and the toothed rack sections 40, 42, in the direction of the brake cylinder 20 in order to conduct the boosting force demanded by the driver additionally into the brake cylinder 20. As a result of the movement of the actuating device 18 with its actuating elements 44, 46 in the direction of the brake cylinder 20, there is generated in the brake cylinder 20 a hydraulic pressure which corresponds to the brake pressure demanded by the driver. The brake cylinder 20 has two openings 48, 50 via which the brake circuits of the vehicle can be charged with hydraulic fluid and thus with hydraulic pressure for generating a braking force at the wheel brakes. At the further opening 52 of the brake cylinder 20, there may be arranged a tank for receiving brake fluid or a pressure compensation tank.

Provided in a region between the brake cylinder 20 and the actuating device 18 is a fastening device 54 which has a flange 56 and openings 58. The openings 58 are designed for receiving the fastening bolts 60, 62. The fastening bolts 60, 62 may be inserted into and fastened in openings at a predetermined fastening position on the vehicle, for example on a bulkhead (not shown). The position of the fastening openings 60, 62 is normally predefined by the vehicle manufacturers.

Figure 2:
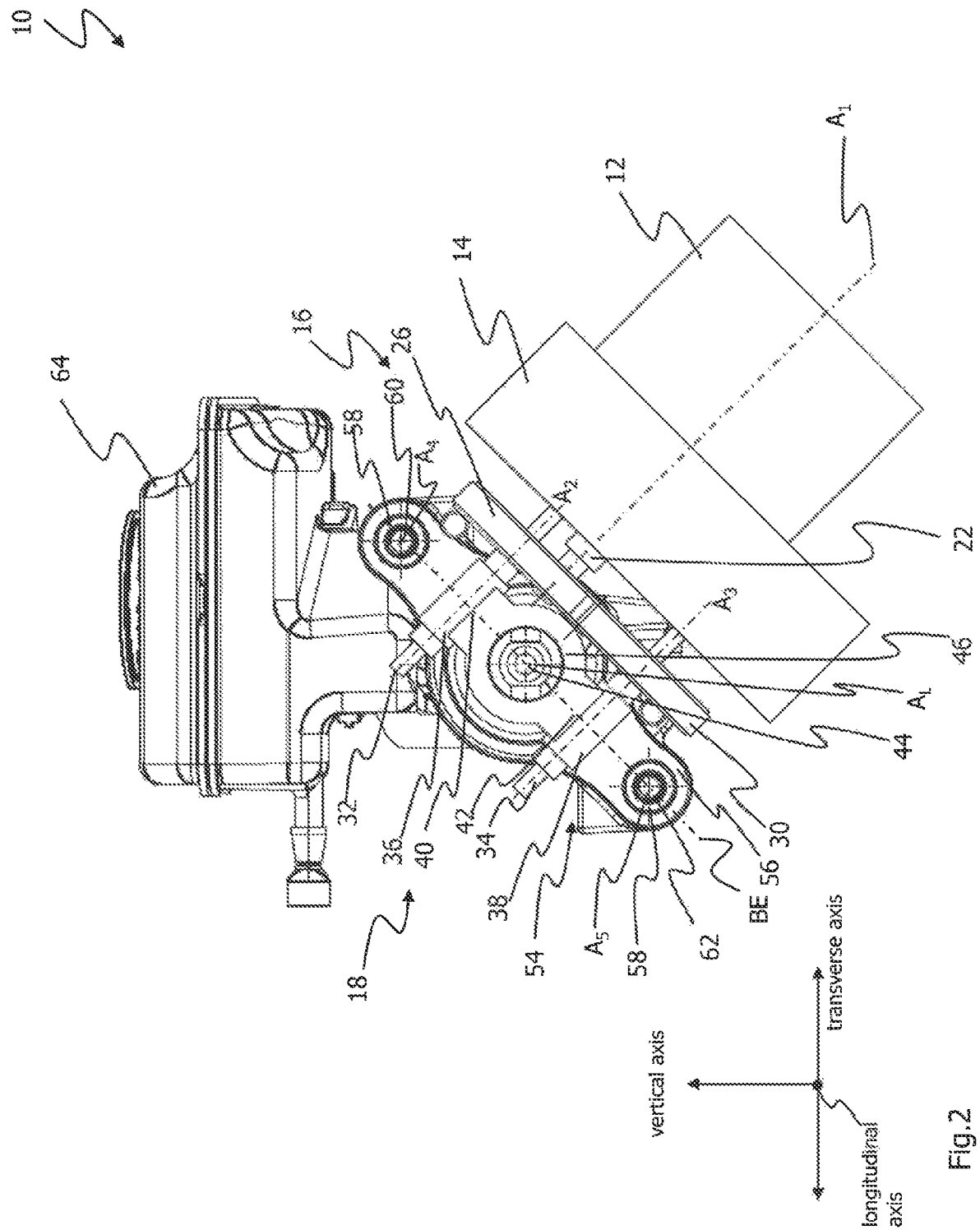
FIG. 2 shows an exemplary embodiment of the electromechanical brake booster with an alternative arrangement of gear mechanism, electric motor and control unit.

FIG. 2 shows a front view of the electromechanical brake booster 10 shown in FIG. 1. The vertical axis, the longitudinal axis and the transverse axis of the vehicle are indicated in FIG. 2. The vertical axis of the vehicle is an axis which extends substantially in a vertical direction. The longitudinal axis AL of the actuating device 18 runs parallel to the longitudinal axis of the vehicle.

The control unit 14 is arranged between the motor 12 and the gear mechanism 16. The electric motor 12 drives the gear mechanism 16, by which the two toothed gears 36 and 38 are driven in order, via the toothed rack sections 40, 42, to displace the actuating device 18 in the direction of the longitudinal axis AL. As a result of the displacement of the actuating device 18 along the longitudinal axis AL, the brake cylinder 20, of which FIG. 2 shows only a tank 64 for the brake fluid, is actuated.

The drive arrangement composed of motor 12, control unit 14 and gear mechanism 16 is arranged at a predetermined angle relative to the vertical axis of the vehicle. The angle is predefined by the axis of rotation A1 of the electric motor 12, which runs at a predetermined angle relative to the vertical axis of the vehicle. Said angle may be 45°. Like the axis of rotation A1 of the electric motor 14, the axes of rotation A2 and A3 of the spur gears 26, 30, of the shafts 32, 34 and of the toothed gears 36 and 38 run at a predetermined angle obliquely with respect to the vertical axis of the vehicle.

The electromechanical brake booster 10 has a fastening device 54. The fastening device 54 comprises a flange 56 with openings 58 and fastening bolts 60, 62. The fastening bolts 60, 62 are connected fixedly to the assembly or the flange 56 on the brake cylinder 20. The fastening bolts 60, 62 span a fastening plane BE. The fastening plane BE extends through the central axes A4 and A5 of the fastening bolts 60, 62. The fastening plane BE runs obliquely, or at a predetermined angle, with respect to the vehicle vertical axis. The longitudinal axis AL of the actuating device 18 lies in the fastening plane BE. The axis of rotation A1 of the electric motor 12 runs perpendicular to the longitudinal axis AL of the actuating device 18 and of the brake cylinder 20. The axis of rotation A1 of the electric motor 12 runs perpendicular to the fastening plane BE. The same applies to the axes of rotation A2 and A3 of the spur gears 26, 30 and of the components connected to the spur gears 26, 30. The axis of rotation A1 does not need to run perpendicular to the fastening plane, but rather may also extend at an angle of 60 to 120° with respect to the fastening plane.

In the exemplary embodiment of the electromechanical brake booster 10 shown in FIG. 2, the electric motor 12, the control unit 14 and the gear mechanism 16 are arranged together on one side of the actuating device 18 or of the fastening plane BE. In this way, a particularly compact construction of the drive arrangement of the brake booster 10 can be realized.

FIGS. 3 to 7 show further exemplary embodiments of the electromechanical brake booster 10, which differ substantially by the arrangement of the motor 12, the control unit 14 and of the gear mechanism 16. Regardless of the arrangement of the drive arrangement with the electric motor 12, the control unit 14 and the gear mechanism 16 on the actuating device 18, the drive arrangement is arranged at the angle predefined by the axis of rotation A1 of the electric motor 12 with respect to the vertical axis of the vehicle. Furthermore, in all exemplary embodiments, the axis of rotation A1 of the electric motor 12 runs perpendicular to the fastening plane BE and also perpendicular to the longitudinal axis AL of the actuating device 18.

Figure 3:
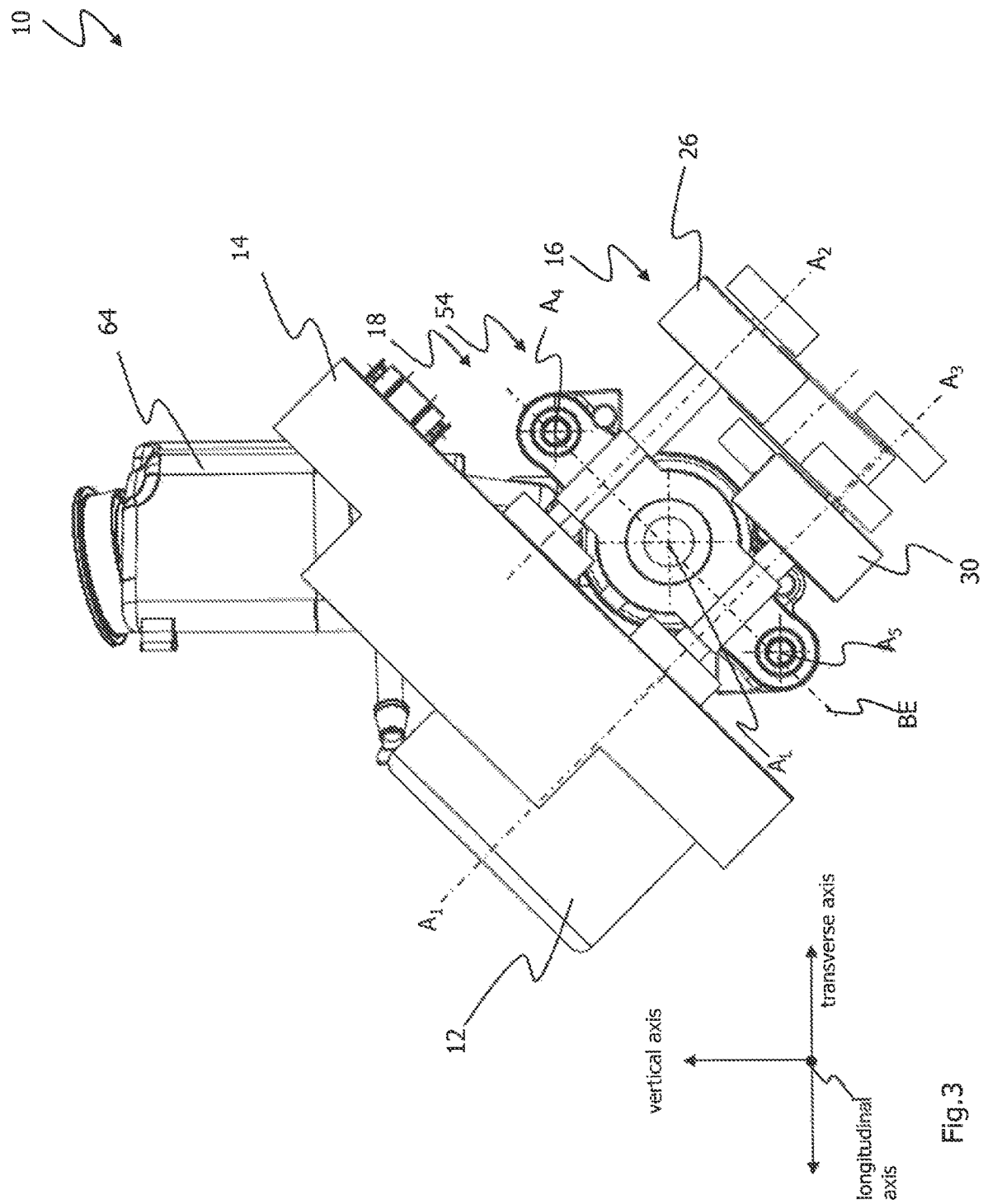
FIG. 3 shows an exemplary embodiment of the electromechanical brake booster with an alternative arrangement of gear mechanism, electric motor and control unit.

FIG. 3 shows a front view of a further exemplary embodiment of the electromechanical brake booster 10, in which the electric motor 12 and the control unit 14 are arranged together on one side of the actuating device 18 and the gear mechanism 14 is arranged on the other side of the actuating device 18. In this exemplary embodiment, too, the axis of rotation A1 of the electric motor 12 runs obliquely with respect to the vertical axis of the vehicle and perpendicular to the fastening plane BE. The axes of rotation A2 and A3 of the spur gears 26 and 30 run obliquely or at a predetermined angle with respect to the vertical axis of the vehicle, but likewise perpendicular to the fastening plane BE. The axis of rotation A1 of the electric motor runs perpendicular to the longitudinal axis AL of the actuating device 18.

The gear mechanism 16 as per this exemplary embodiment differs from the construction of the gear mechanism 16 described above. This variant of the gear mechanism 16 will be discussed in detail during the further course of this description with reference to FIGS. 12 to 16. The actuating device 18 corresponds to the actuating device described in detail with reference to FIGS. 1 and 2. It must however be stated here that the motor output shaft 22 extends from that side of the actuating device 18 at which the motor 12 is arranged to the other side with the gear mechanism 16 in order to be able to transmit a torque generated by the motor 12 to the gear mechanism 16.

Figure 4:
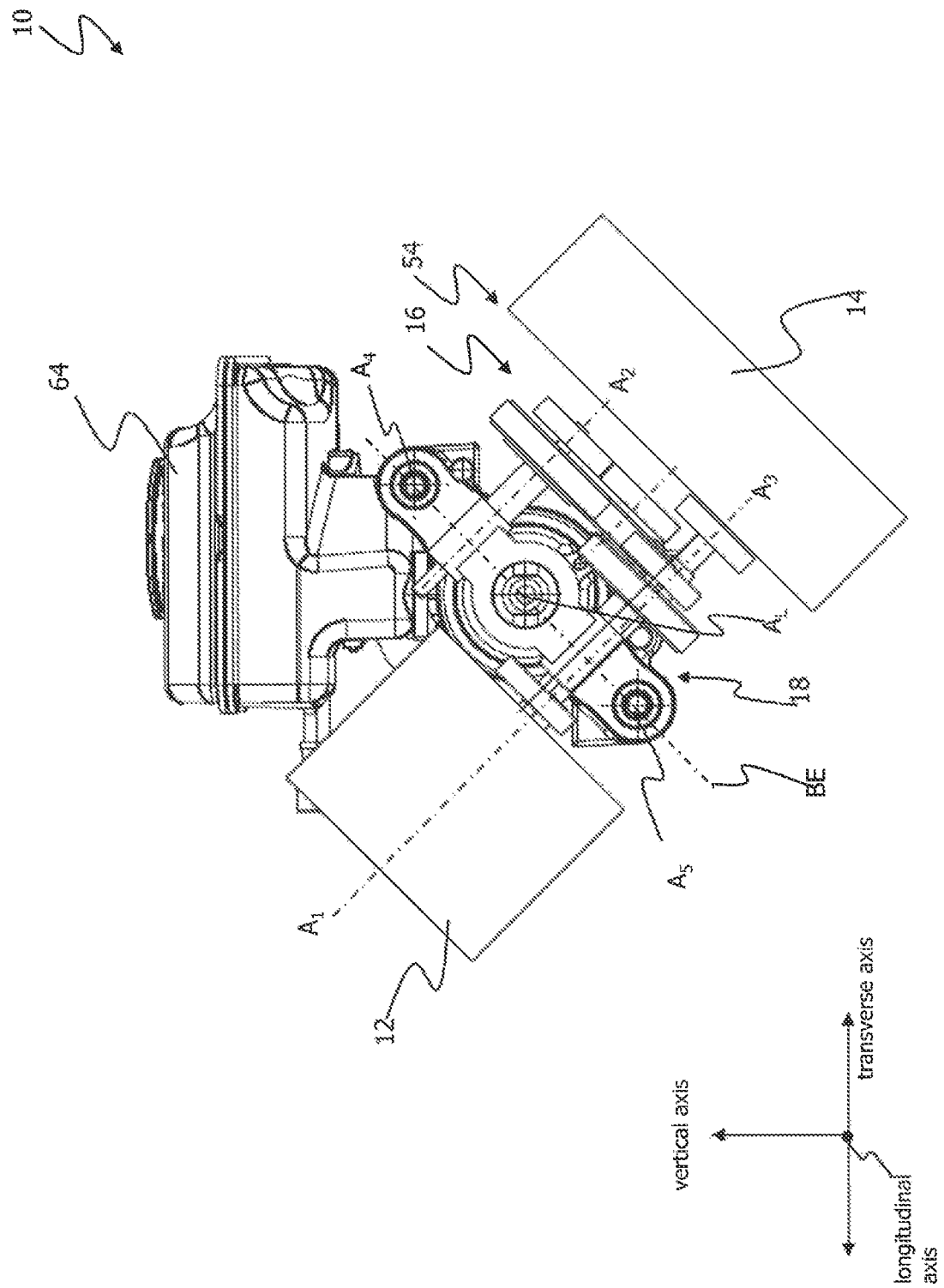
FIG. 4 shows an exemplary embodiment of the electromechanical brake booster with an alternative arrangement of gear mechanism, electric motor and control unit.

FIG. 4 shows a front view of a further exemplary embodiment of the brake booster 10. In this exemplary embodiment, the electric motor 12 is arranged on one side of the actuating device 18 or on one side of the fastening plane BE. The gear mechanism 16 is arranged together with the control unit 14 on that side of the actuating device 18 which is averted from the motor 12, and on the respective other side of the fastening plane BE. The axes of rotation A1, A2 and A3 run obliquely or at a predetermined angle with respect to the vertical axis of the vehicle, and perpendicular to the fastening plane BE. The axis of rotation A1 of the electric motor runs perpendicular to the longitudinal axis AL of the actuating device 18.

Figure 5:
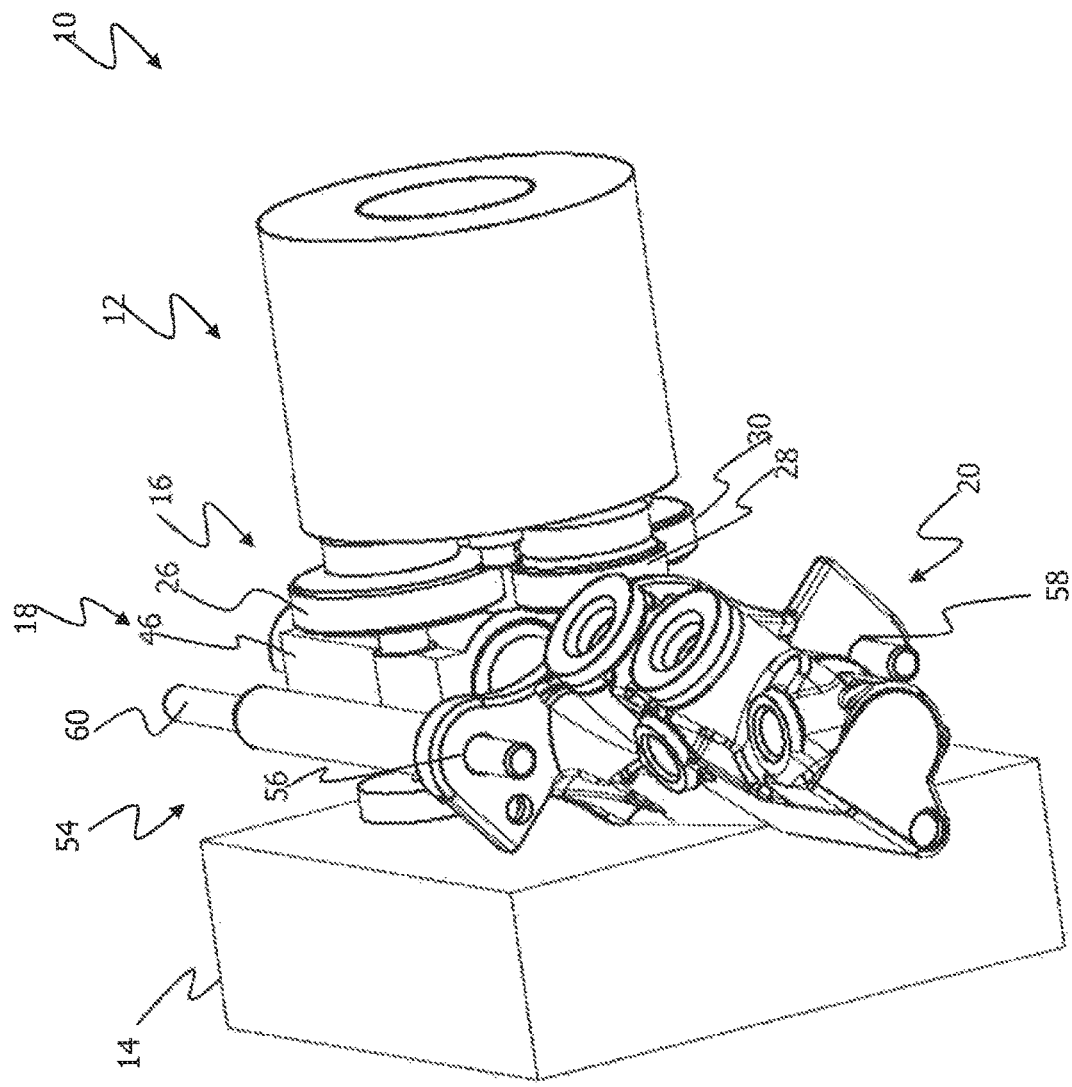
FIG. 5 shows an exemplary embodiment of the electromechanical brake booster with an alternative arrangement of gear mechanism, electric motor and control unit.

FIG. 5 shows a perspective view of a further exemplary embodiment of the brake booster 10. In this exemplary embodiment of the brake booster 10, the motor 12 is provided together with the gear mechanism 16 on one side of the actuating device 18 or of the brake cylinder 20. The control unit 14 is provided on that side of the actuating device 18 or of the brake cylinder 20 which is averted from the gear mechanism 16. In this exemplary embodiment, too, the motor output shaft 22 extends from the side with the motor 12 to the side with the gear mechanism 16. Here, the motor output shaft 22 extends through the fastening plane BE.

Figure 6:
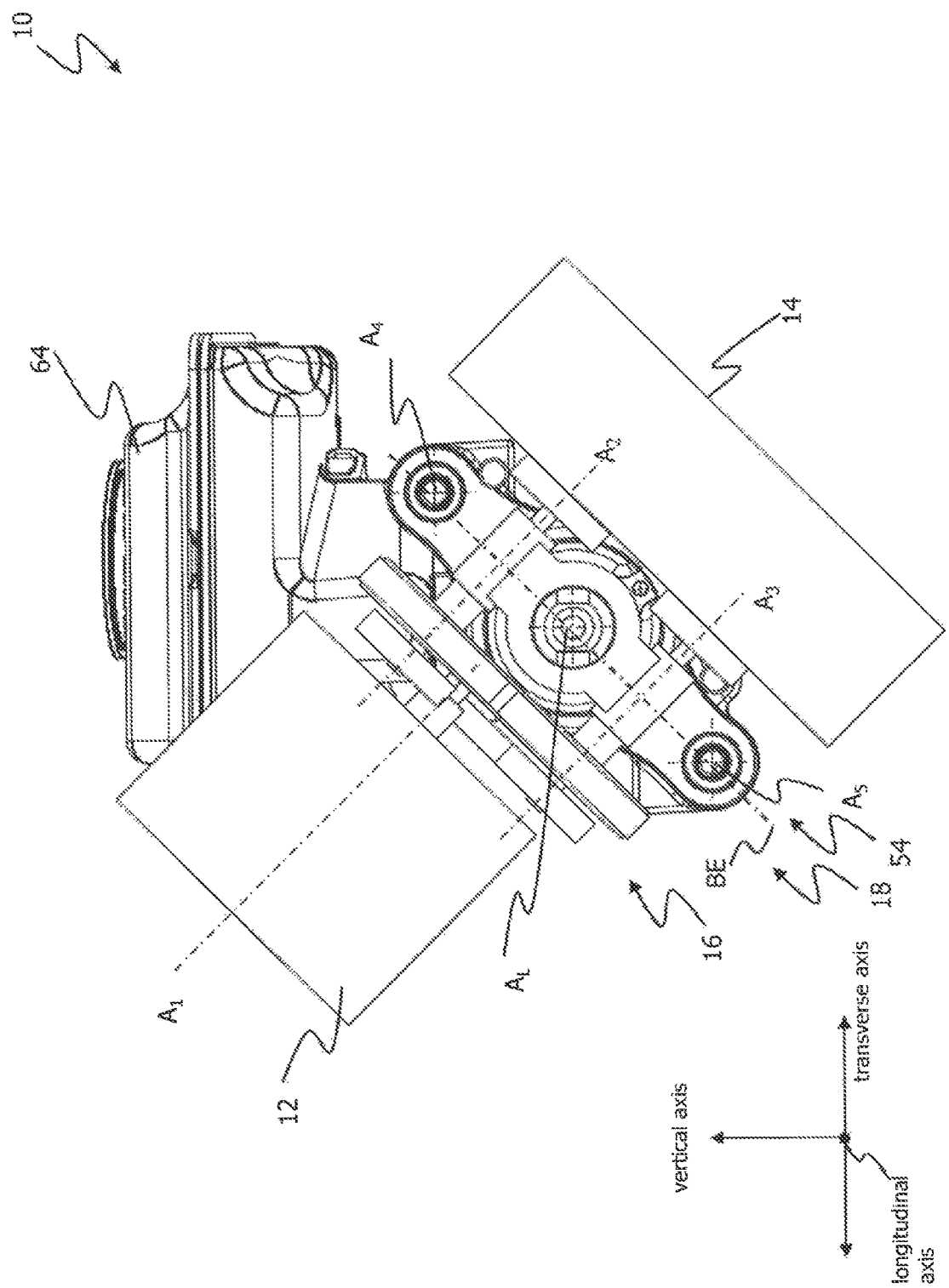
FIG. 6 shows an exemplary embodiment of the electromechanical brake booster with an alternative arrangement of gear mechanism, electric motor and control unit.

FIG. 6 shows a front view of the electromechanical brake booster 10 as per FIG. 5. The electric motor 12 and the gear mechanism 16 are arranged on one side of the actuating device 18 or of the fastening plane BE. The control unit 14 is arranged on the respective other side of the actuating device 18 or of the fastening plane BE. The axes of rotation A1, A2 and A3 run obliquely with respect to the vertical axis of the vehicle but perpendicular to the fastening plane BE.

Figure 7:
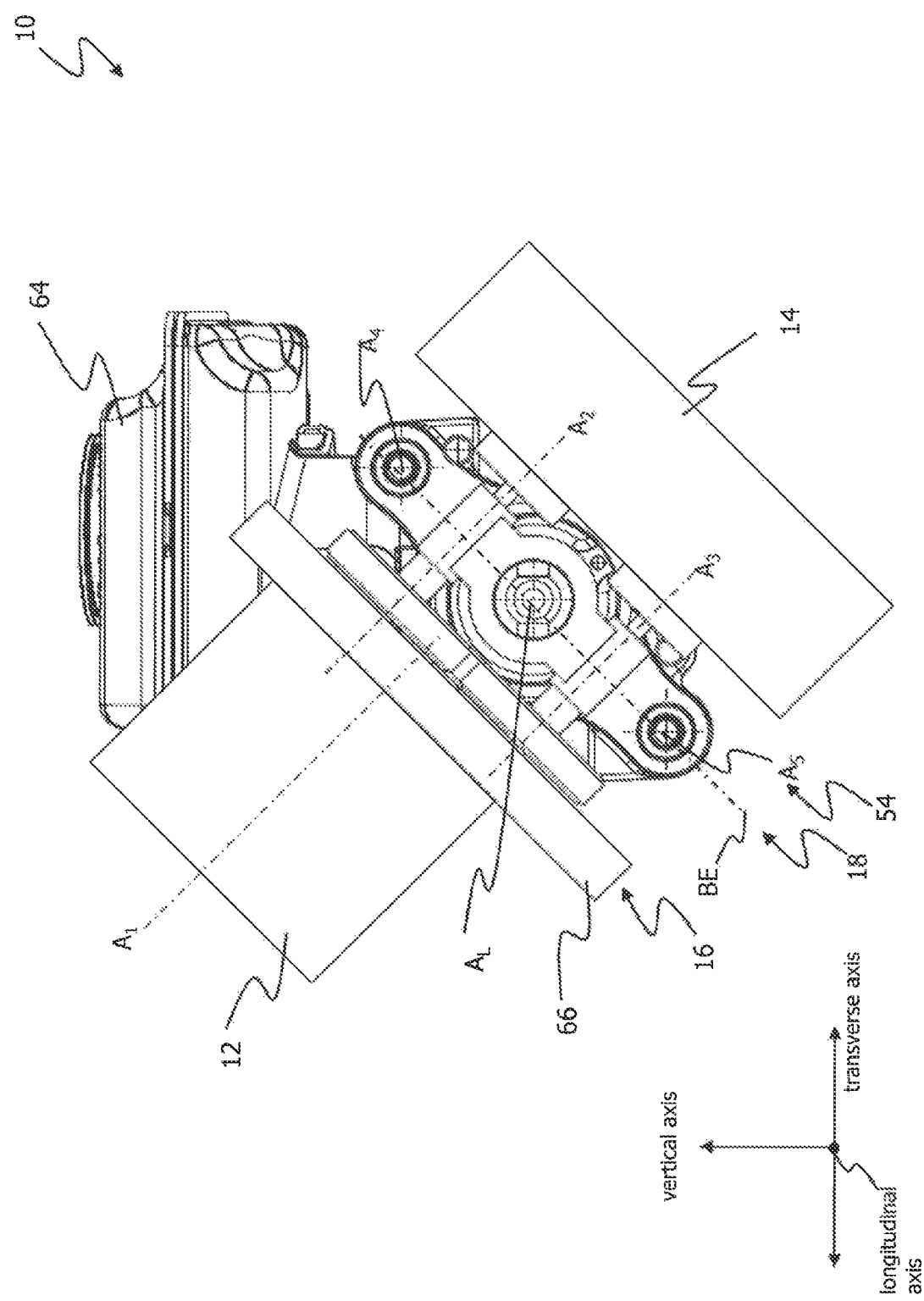
FIG. 7 shows an exemplary embodiment of the electromechanical brake booster with an alternative arrangement of gear mechanism, electric motor and control unit.

The view as per FIG. 7 substantially corresponds to the view as per FIG. 6. Parts of the gear mechanism 16 and of the motor output shaft 22 are hidden by a gear mechanism housing 66 for accommodating bearing forces of the axes of rotation A2, A3, A6 or rotary shafts.

Figure 8:
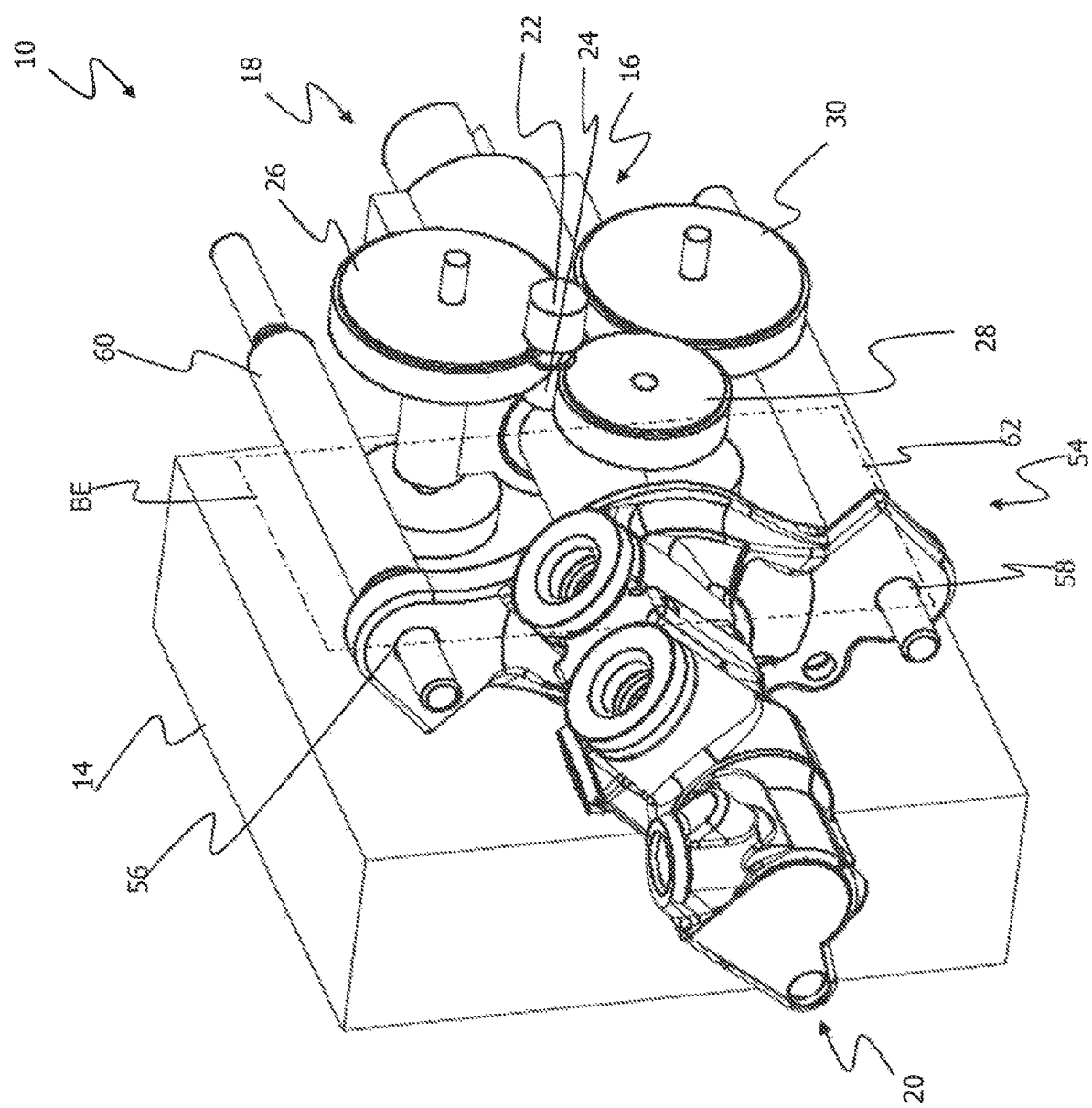
FIG. 8 shows a perspective view of an electromechanical brake booster having a gear mechanism according to a first design variant.

FIG. 8 shows a perspective view of the electromechical brake booster 10 with a gear mechanism 16 according to a first design variant. The gear mechanism 16 has a first spur gear 26 and a second spur gear 30. The first spur gear 26 is driven directly by the motor shaft 22 via a pinion 24 which is shown merely schematically in FIG. 8 and which is arranged on the motor output shaft 22. An intermediate toothed gear 28 is also driven directly via the pinion 24. The intermediate toothed gear 28 in turn drives the second spur gear 30. By means of the intermediate gear 28, it is achieved that the direction of rotation of the second spur gear 30 is reversed compared to the direction of rotation of the first spur gear 26, such that the spur gears 26 and 30 rotate in opposite directions. The opposite directions of rotation of the first spur gear and of the second spur gear are required in order to be able to drive the actuating device 18 with both spur gears 26 and 30.

The first spur gear 26, the intermediate gear 28, the second spur gear 30 and the pinion 24 on the motor output shaft 22 are arranged, in the direction of the axis of rotation A1 of the electric motor 12, in a plane.

Figure 9:
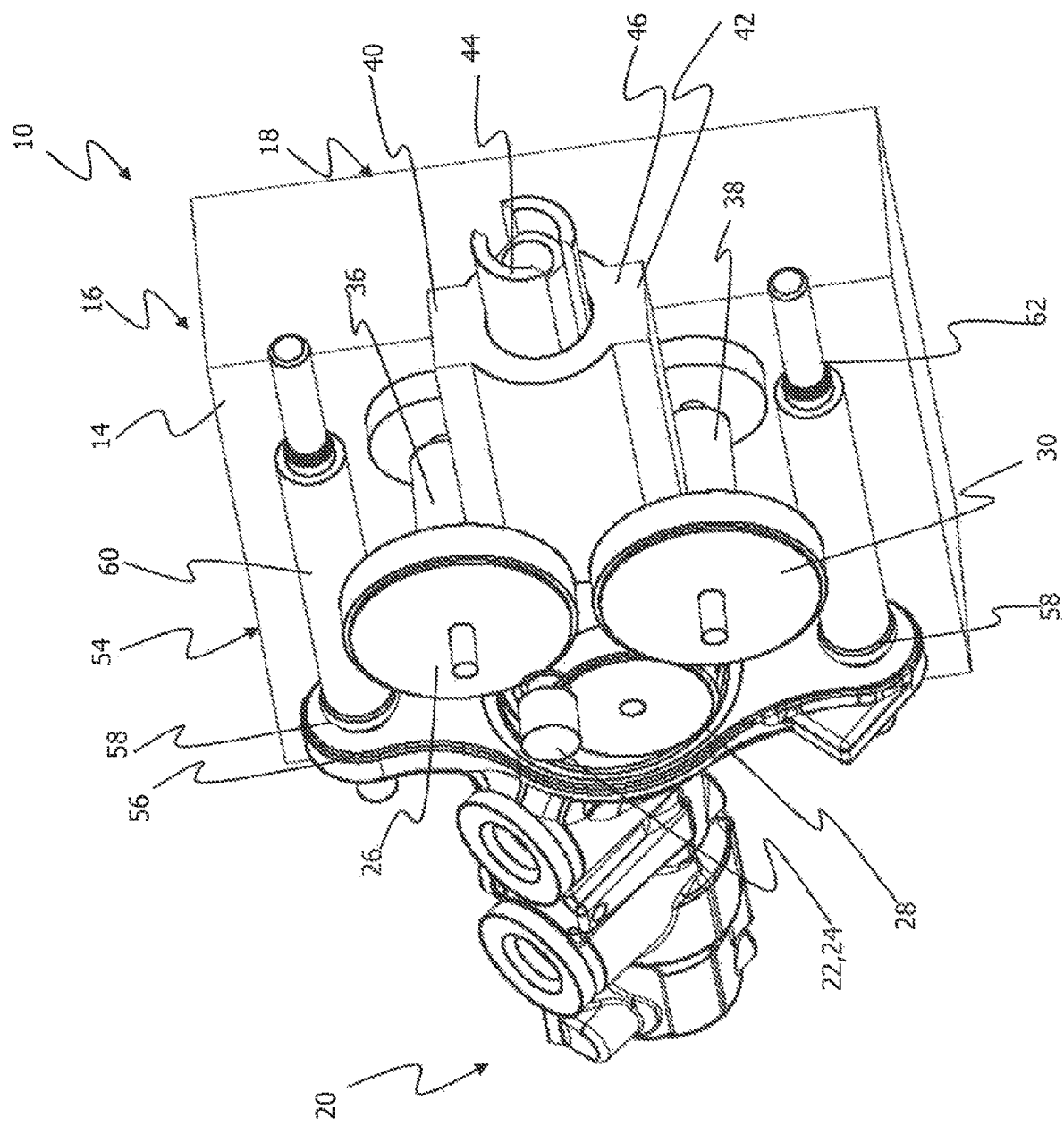
FIG. 9 shows a perspective view of an electromechanical brake booster having a gear mechanism according to the first design variant.

FIG. 9 shows a further perspective view of the brake booster 10 shown in FIG. 8. The actuating device 18 is made up of a first actuating element 44 and a second actuating element 46. The second actuating element 46 may be driven by the gear mechanism 16. For this purpose, the second actuating element 46 has the toothed rack sections 40 and 42, into which toothed gears 36 and 38 engage. The toothed gears 36 and 38 are connected to the first spur gear 26 and to the second spur gear 30 and are driven by the spur gears 26, 30. The first spur gear 26 is driven directly by the pinion 24 on the motor output shaft 22. The pinion 24 on the motor output shaft 22 drives the intermediate gear 28, which in turn drives the second spur gear 30. If a braking force exerted on a brake pedal (not shown) by the driver is transmitted to the first actuating element 44, the actuating element 44 is moved in the direction of the brake cylinder 20. The control unit 14 actuates the motor 12 on the basis of the braking force exerted on the brake pedal by the driver. The motor 12 drives the gear mechanism 16 in order to displace the second actuating element 46 in the direction of the cylinder 20 along the longitudinal axis AL of the actuating device 18. As a result of the displacement of the actuating device 18 in the direction of the brake cylinder 20, boosting of the braking force is realized, and a brake pressure is generated at the wheel brakes (not shown) by means of the brake cylinder 20.

Figure 10:
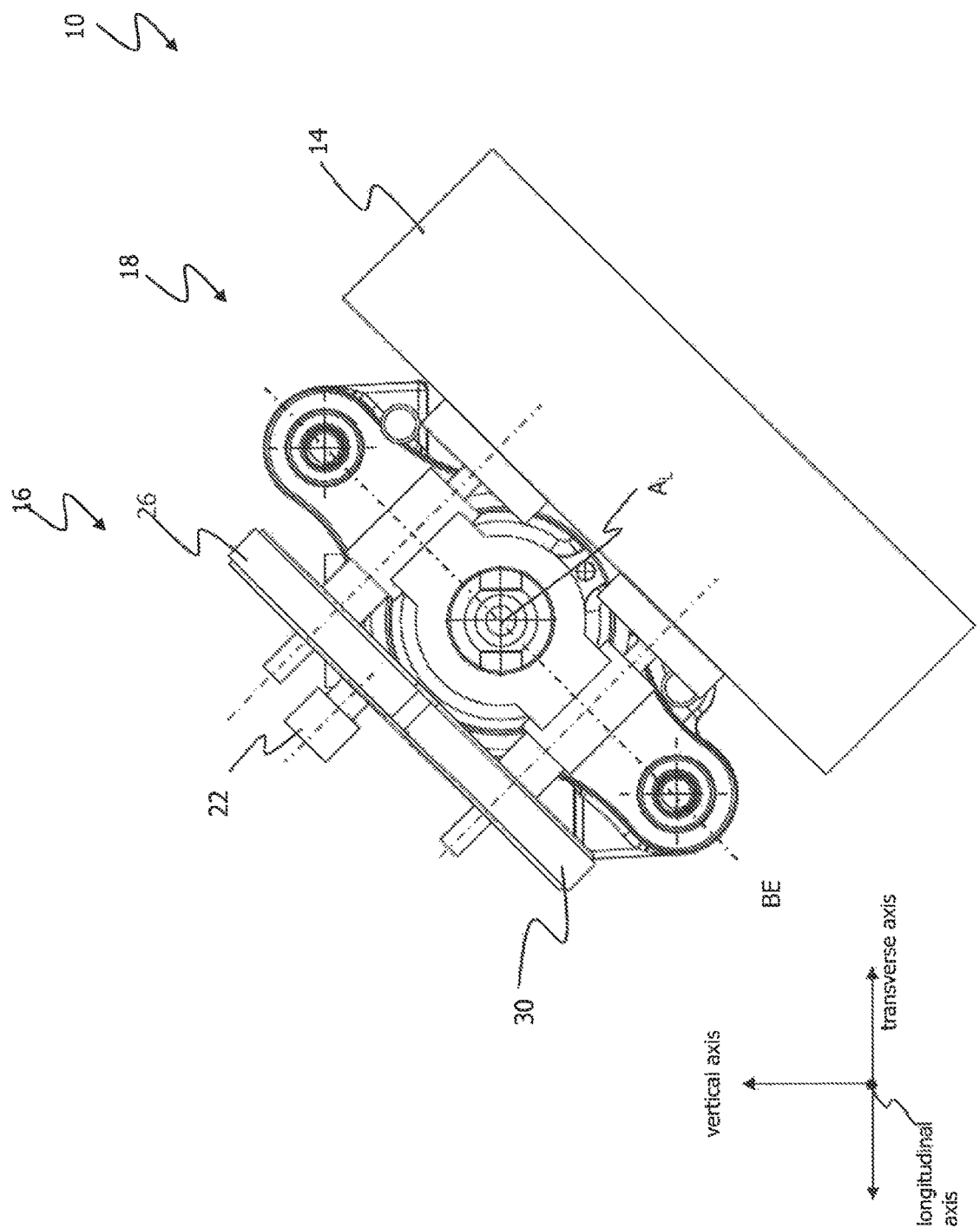
FIG. 10 shows a perspective view of an electromechanical brake booster having a gear mechanism according to the first design variant.

FIG. 10 shows a front view of the brake booster 10 shown in FIGS. 8 and 9. In FIG. 10, it can be seen in particular that all of the toothed gears of the gear mechanism 16 lie in alignment or in a plane, that is to say the spur gears 26, 30, the intermediate gear 28 and the pinion 24 are not offset with respect to one another in the direction of the axis of rotation A1 of the motor.

Figure 11:
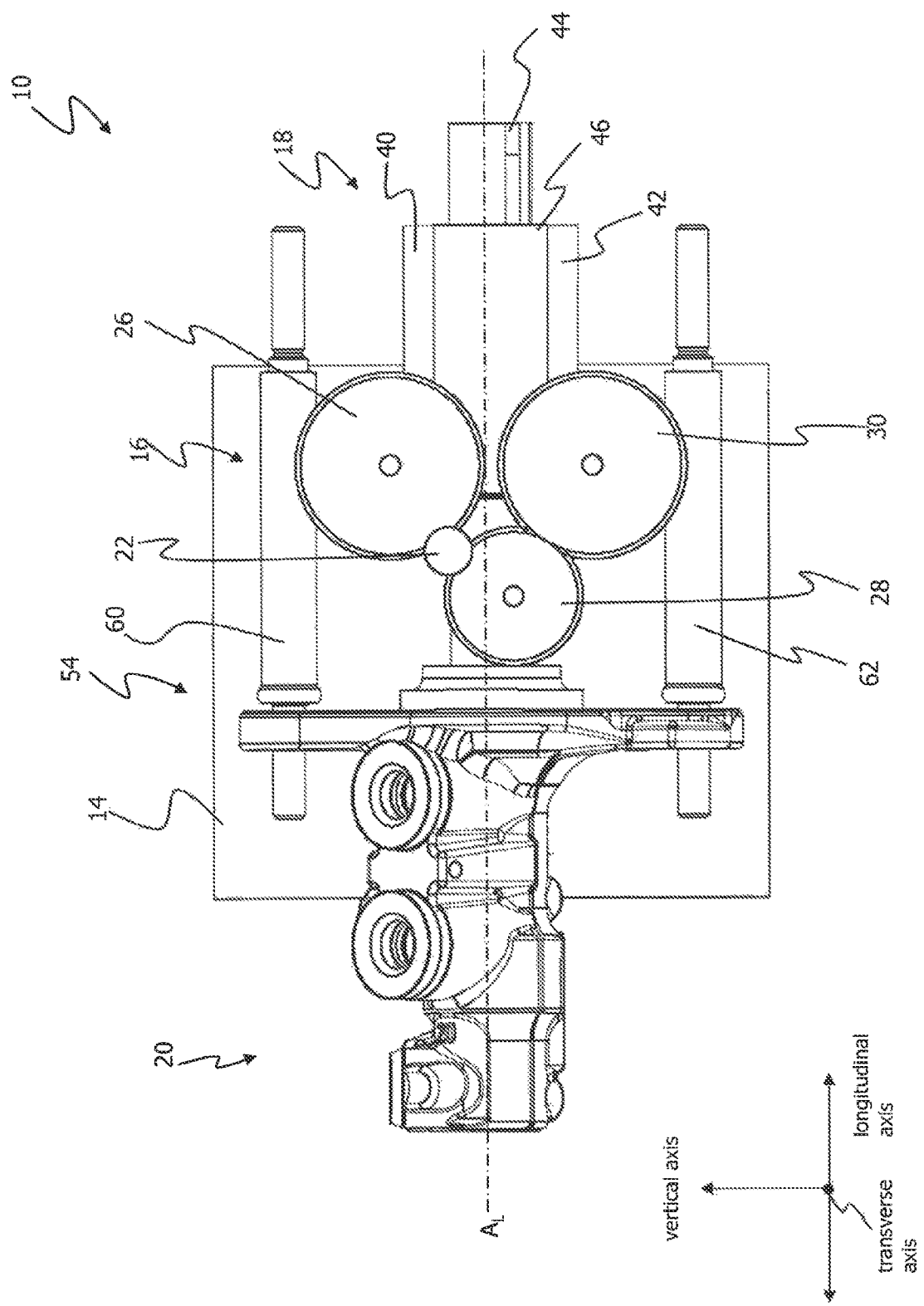
FIG. 11 shows a perspective view of an electromechanical brake booster having a gear mechanism according to the first design variant.

FIG. 11 shows a side view of the electromechanical brake booster 10 shown in FIGS. 8 to 10. The toothed rack section 40 is, in FIG. 11, arranged on the second actuating element 46 above the longitudinal axis AL of the actuating device 18. The toothed rack section 42 is provided on the second actuating element 46 below the longitudinal axis AL. To be able to displace the actuating device 18 in the direction of the brake cylinder 20, the first spur wheel 26 drives the upper toothed rack section 40 and the second spur wheel 30 drives the lower toothed rack section 42. The actuating device 18 is connected to the brake cylinder 20, which adjoins the actuating device 18 in the direction of the longitudinal axis AL.

In FIG. 11, it is furthermore clear that the first spur gear 26 is driven directly by the motor output shaft 22, whereas the intermediate gear 28 is arranged between the pinion 24 and the second spur gear 30. The transmission of torque takes place from the pinion 24 via the intermediate gear 28 to the second spur gear 30.

The fastening device 54 is provided between the brake cylinder 20 and the actuating device 18. The fastening device 54 has the fastening bolts 60, 62, which extend in the direction of the longitudinal axis of the vehicle and span the fastening plane BE.

Figure 12:
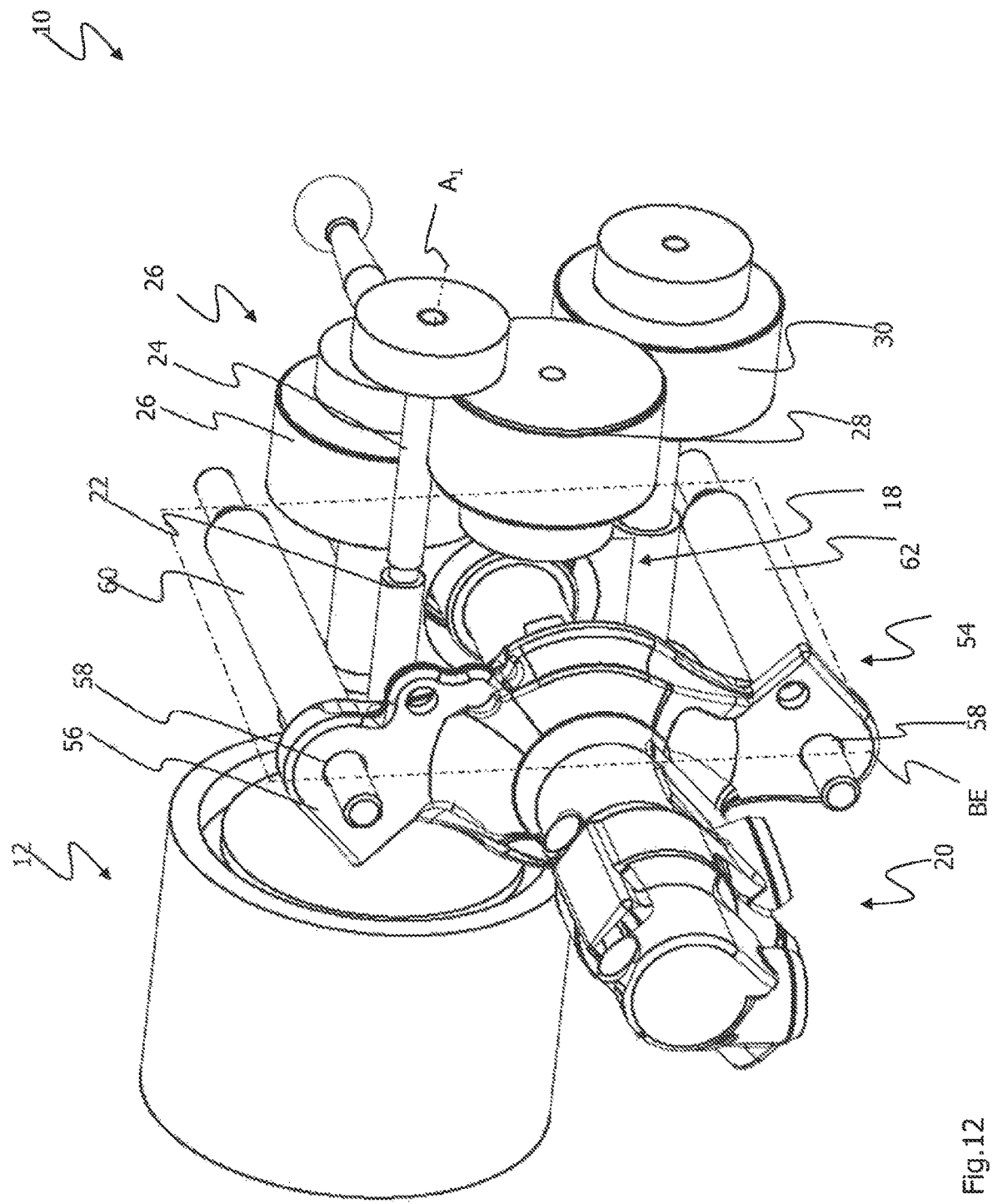
FIG. 12 shows a perspective view of an electromechanical brake booster having a gear mechanism according to a second design variant.

FIG. 12 shows a perspective view of the electromechanical brake booster 10 with a gear mechanism 16 as per a second design variant. It can be seen in FIG. 12 that the first spur gear 26 and the second spur gear 30 lie in different planes. The intermediate gear 28 and the first spur gear 26 are also arranged offset with respect to one another in the direction of the motor output shaft 22 or the axis of rotation A1 of the electric motor 12.

On the motor output shaft 22 there is provided a pinion 24 which can drive the first spur gear 26 and the intermediate gear 28 despite the fact that the first spur gear 26 and the intermediate gear 28 are arranged offset with respect to one another in the direction of the axis of rotation A1. The pinion 24 is accordingly designed and dimensioned so as to span the extent of the outer circumferential surfaces of the first spur gear 26 and of the intermediate gear 28 in the direction of the axis of rotation A1 of the electric motor 12, and to thus be able to drive both the first spur gear 26 and the intermediate gear 28. The motor output shaft 22 extends from the motor 12 to the gear mechanism 16, which is arranged on the other side of the actuating device 18. Here, the motor output shaft 22 extends through the fastening plane BE.

Figure 13:
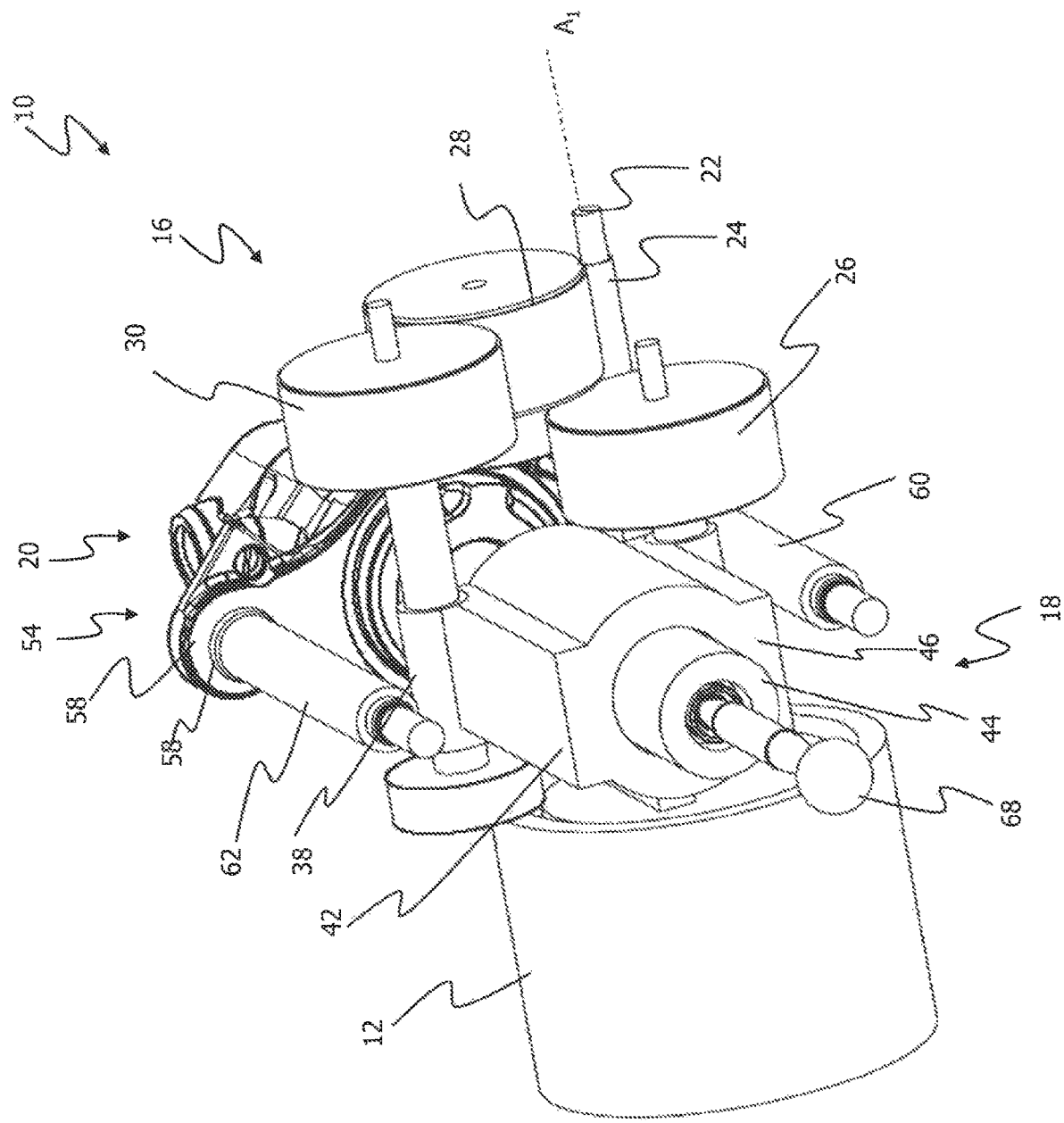
FIG. 13 shows a perspective view of an electromechanical brake booster having a gear mechanism according to the second design variant.

FIG. 13 shows a further perspective view of the electromechanical brake booster 10 shown in FIG. 12. The actuating device 18 is connected to a force transmission element 68, which transmits a braking force exerted on a brake pedal to the actuating device 18. The force transmission element 68 is coupled to the first actuating element 44.

The motor output shaft 22 or the pinion 24 on the motor output shaft 22 directly drives the first spur gear 26 and the intermediate gear 28. The intermediate gear 28 drives the second spur gear 30. By means of the intermediate gear 28, the direction of rotation of the second spur gear 30 can be reversed, such that the first spur gear 26 and the second spur gear 30 rotate in opposite directions.

The second spur gear 30 and the intermediate gear 28 are arranged, in the direction of the axis of rotation A1, in a plane. The first spur gear 26 is arranged offset with respect to the intermediate gear 28 and with respect to the second spur gear 30 in the direction of the axis of rotation A1 of the electric motor 12. In other words, the intermediate gear 28 and the second spur gear 30 are arranged in a different plane than the first spur gear 26.

Figure 14:
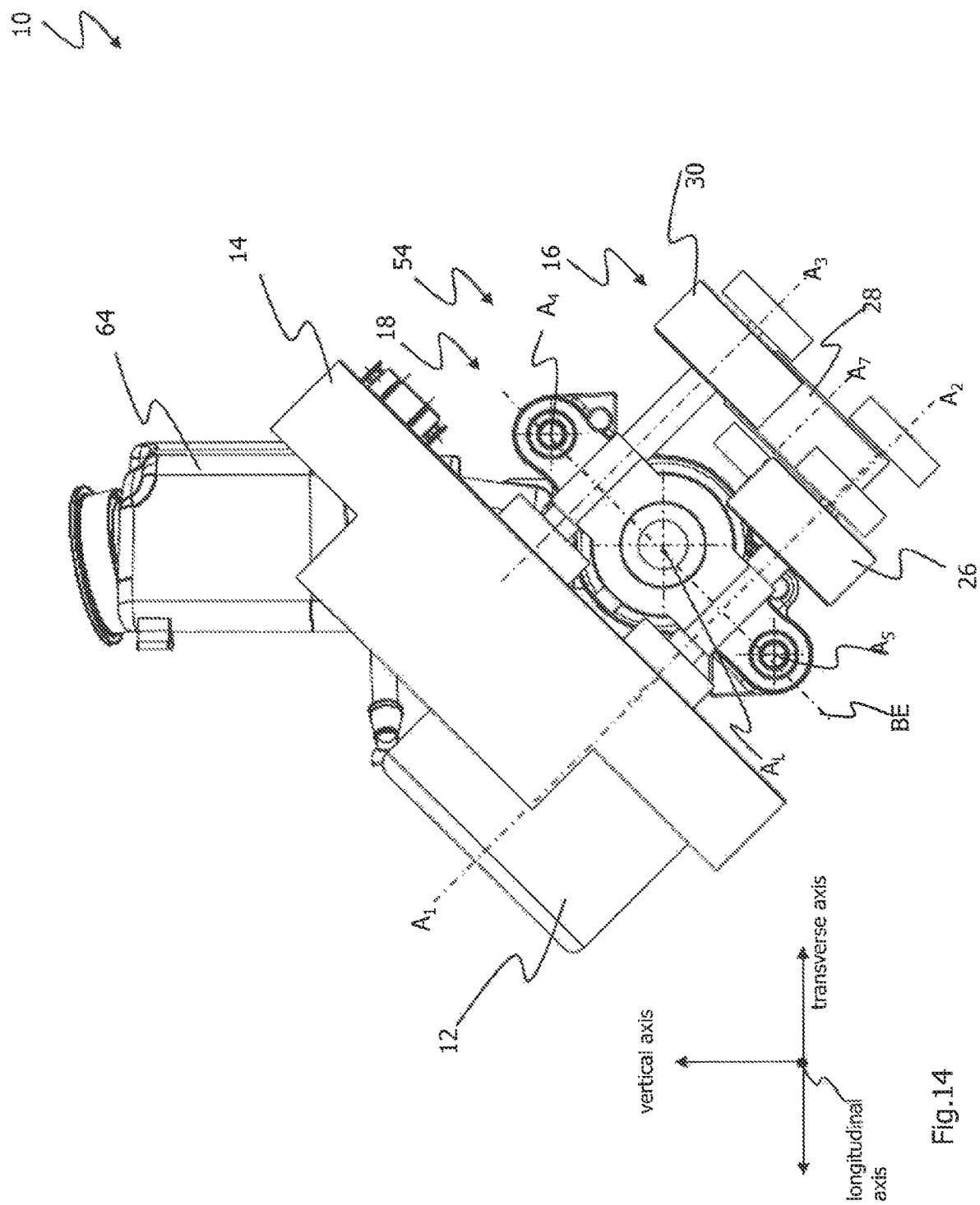
FIG. 14 shows a perspective view of an electromechanical brake booster having a gear mechanism according to the second design variant.

FIG. 14 shows a front view of the electromechanical brake booster 10 illustrated in FIGS. 12 and 13. The axis of rotation A1 of the electric motor 12 runs obliquely at a predetermined angle with respect to the vertical axis of the vehicle. The axis of rotation A1 of the electric motor 12 runs perpendicular to the fastening plane BE. In the direction of the axis of rotation A1 of the electric motor 12, the first spur gear 26 is arranged offset with respect to the second spur gear 30 and with respect to the intermediate gear 28. The axes of rotation A2 of the first spur gear 26, A3 of the second spur gear 30 and A6 of the intermediate gear 28 run parallel to one another but perpendicular to the fastening plane BE and obliquely with respect to the vertical axis of the vehicle.

Figure 15:
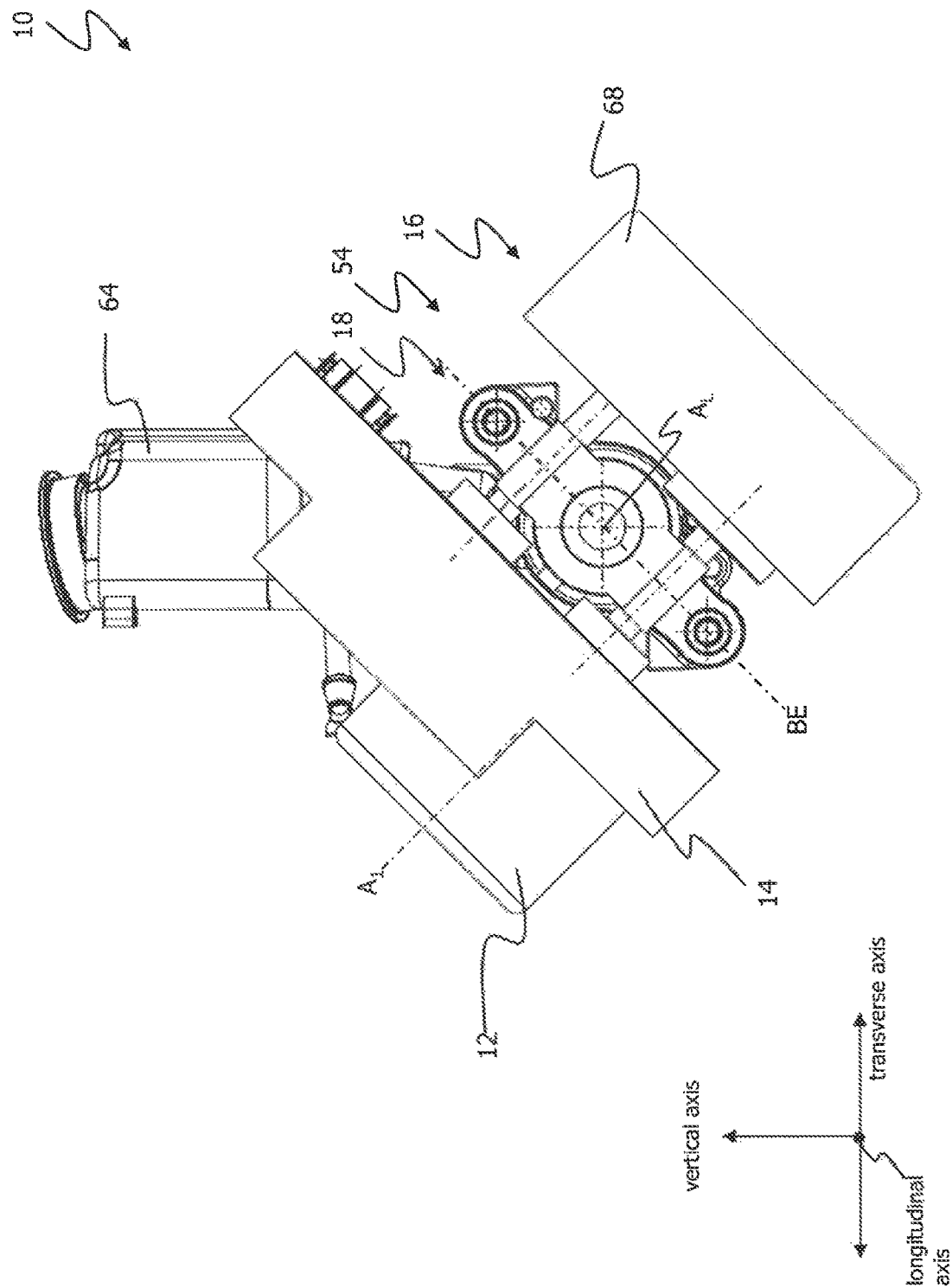
FIG. 15 shows a perspective view of an electromechanical brake booster having a gear mechanism according to the second design variant.

FIG. 15 shows a view of an electromechanical brake booster 10 which substantially corresponds to the illustration as per FIG. 14, but with the difference that the gear mechanism 16 is formed with a gear mechanism housing 68 for accommodating the bearing forces of the individual axes of rotation A2, A3, A6.

Figure 16:
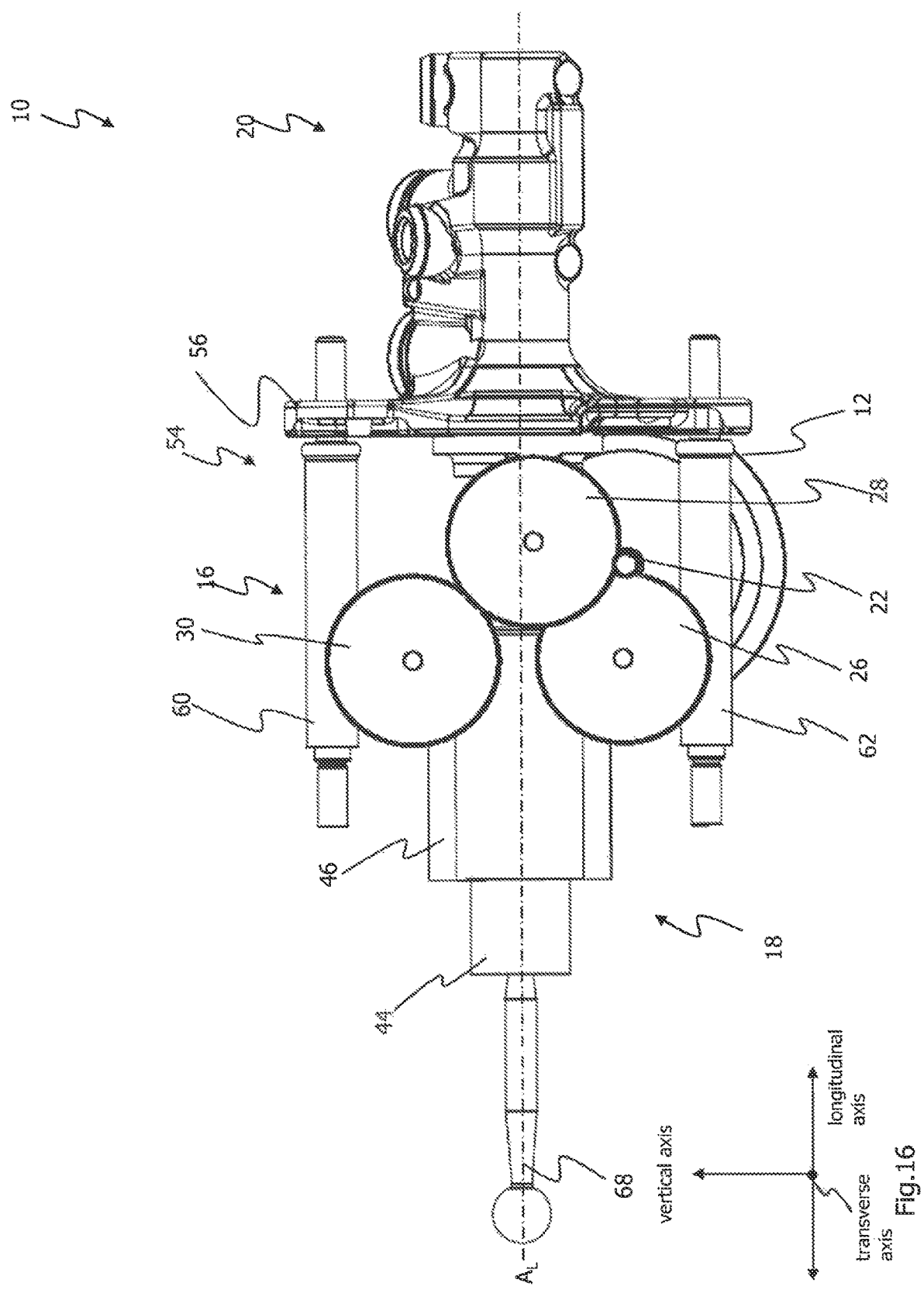
FIG. 16 shows a perspective view of an electromechanical brake booster having a gear mechanism according to the second design variant.

FIG. 16 shows a side view of the electromechanical brake booster 10. In FIG. 16, it is likewise clear that the second spur gear 30 and the intermediate gear 28 are arranged in a plane. The first spur gear 26 is arranged offset with respect to the second spur gear 30 and the intermediate gear 28. In the direction of the transverse axis of the vehicle, the intermediate disk 28 partially overlaps the first spur gear 26. The motor output shaft 22 projects below the region of overlap of first spur gear 26 and the intermediate gear 28. The first spur gear 26 and the intermediate gear 28 are driven directly by the motor output shaft 22, even though the first spur gear 26 and the intermediate gear 28 are arranged offset with respect to one another.

Figure 17:
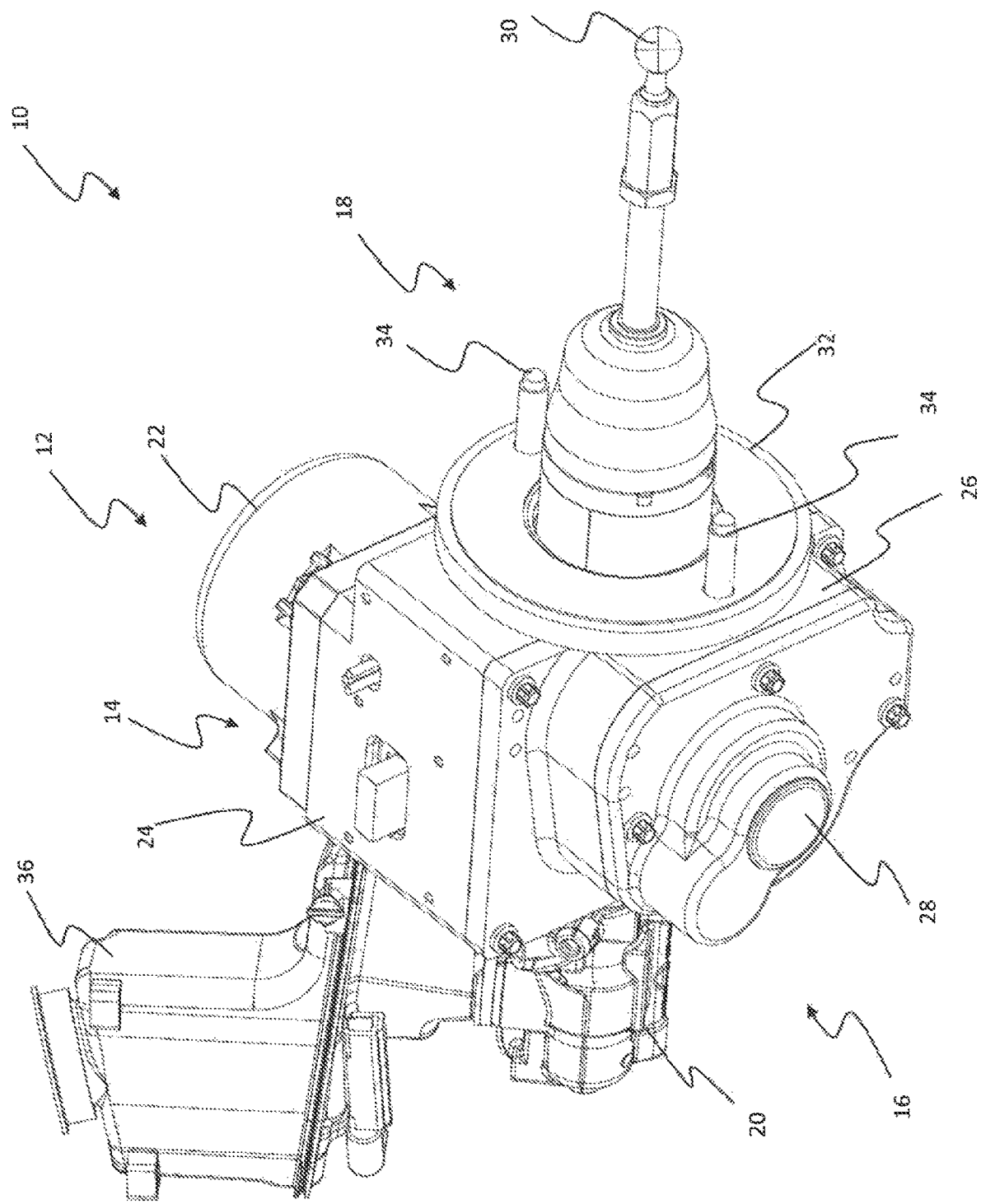
FIG. 17 shows a perspective view of an electromechanical brake booster having a gear mechanism according to a third design variant.

FIG. 17 shows a perspective view of the electromechanical brake booster 10 with a gear mechanism 16 as per a third design variant.

The brake booster 10 has a multi-part housing with housing parts 22, 24, 26 and 28. The housing parts 22 and 24 are assigned to the motor 12, to the control unit 14 and to the actuating device 18. The housing parts 26 and 28 serve for accommodating the gear mechanism 14. The motor 12 is arranged on a side of the actuating device 18 which is averted from that side of the actuating device which has the gear mechanism 16. The electromechanical brake booster 10 and the brake cylinder 20 form an assembly.

The actuating device 18 has an actuating element 30 which is actuable by means of a pedal force generated by a driver of the vehicle and which serves for actuating the brake cylinder 20 and the electromechanical brake booster 10. Furthermore, the actuating device 18 extends through a ring-shaped paneling element 32. Fastening elements 34 which may serve for the fastening of a pedal arrangement in the interior compartment of the vehicle extend through the ring-shaped paneling element 32. The fastening elements 34 are attached to the housing parts 24 and 26 and are of bolt-like form. In the fitted state on the vehicle, the bulkhead extends between the housing parts 22, 24, 26 and 28 and the paneling element 32. A tank 36 for brake fluid is arranged on the brake cylinder 20.

Figure 18:
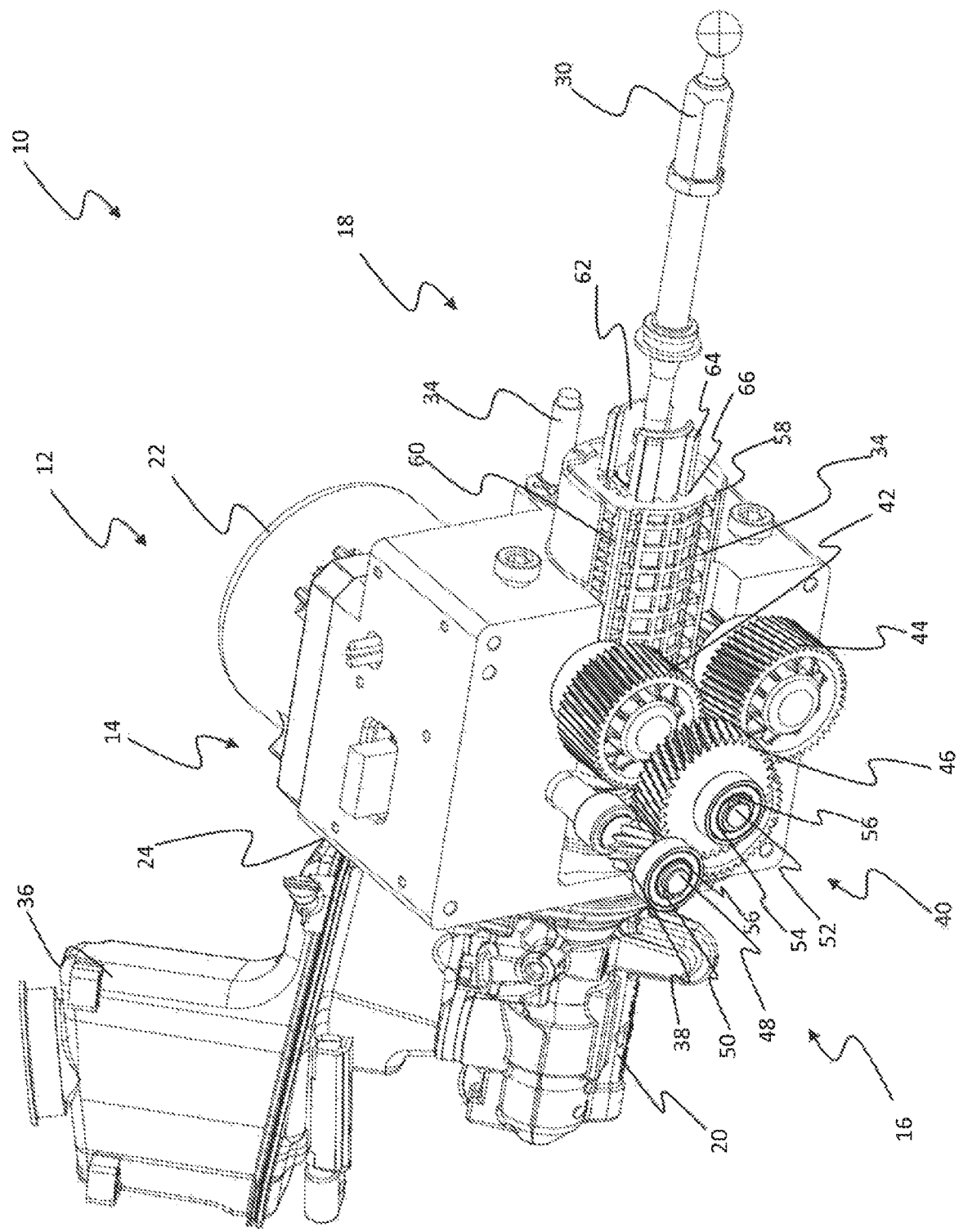
FIG. 18 shows a perspective view of an electromechanical brake booster having a gear mechanism according to the third design variant.

FIG. 18 shows a perspective view of the electromechanical brake booster 10, in which the housing parts 26 and 28 have been removed. The gear mechanism 16 has an input gear wheel 38, an intermediate gear mechanism stage 40, a first spur gear 42, and a second spur gear 44. Of the intermediate gear mechanism stage 40, FIG. 18 shows the first toothed gear 46. The first toothed gear 42 of the intermediate gear mechanism stage 40 is in torque-transmitting engagement with the input toothed gear 38. The first spur gear 42 and the second spur gear 44 are driven by the intermediate gear mechanism stage 40. The spur gears 42 and 44 drive the actuating device 18.

The input toothed gear 38 is arranged on an input shaft 48 of the gear mechanism 16. The input shaft 48 has a bearing element 50. The input shaft 48 is mounted by means of the bearing element 50 on a bearing point formed on the housing part 28 (see FIG. 17). The intermediate gear mechanism stage 40 has a shaft section 52 which extends along the axis of rotation of the intermediate gear mechanism stage 40. On the shaft section 52 there is provided a bearing element 54 by means of which the intermediate gear mechanism stage 40 is mounted on a bearing point formed on the housing part 28. The bearing elements 50 and 54 are held by securing rings 56 on the input shaft 48 and on the shaft section 52 of the intermediate gear mechanism stage 40. The bearing elements 50 and 54 may be rolling bearings such as, for example, ball bearings.

The actuating element 30 can actuate the electromechanical brake booster 10 and the brake cylinder 20 coupled thereto. The actuating element 30 is coupled to the actuating device 18. The actuating device 18 has an actuating element 58 which is displaceable in translational fashion and which can be driven by the gear mechanism 16. The actuating element 58, which is displaceable in translational fashion, has toothed rack sections 60, of which, in FIG. 18, only one is partially visible on the top side of the actuating element 58. A toothed rack section is likewise provided on the bottom side of the actuating element 58. Furthermore, the actuating device has an actuating unit 62. The actuating unit 62 is accommodated in the actuating element 58. With the actuating unit 62, the actuating force exerted on the actuating element 30 as a result of an actuation of the brake pedal can be transmitted at least partially to the brake cylinder 20. The actuating element 58 and the actuating unit 62 are displaceable relative to one another along the longitudinal axis of the actuating device 18. In the receiving opening in the actuating element 58 for the actuating unit 62, there are formed recesses 64 which interact with complementary projections 66 on the actuating unit 62. The relative movement between the actuating element 58 and the actuating unit 62 is guided by the complementary recesses 64 and projections 66.

The actuating unit 62 can be acted on with a braking force exerted on a brake pedal by a driver of the vehicle. This causes the actuating unit 62 to be moved in the direction of the brake cylinder 20. The boosting force demanded by the driver is generated by the actuating device 18, which is driven by the electric motor 12 via the gear mechanism 16. For this purpose, the actuating element 58 is moved by the electric motor 12, via the gear mechanism 16 and in particular via the toothed gears 70 and the toothed rack sections 60, in the direction of the brake cylinder 20 in order to conduct the boosting force demanded by the driver additionally into the brake cylinder 20.

Figure 19:
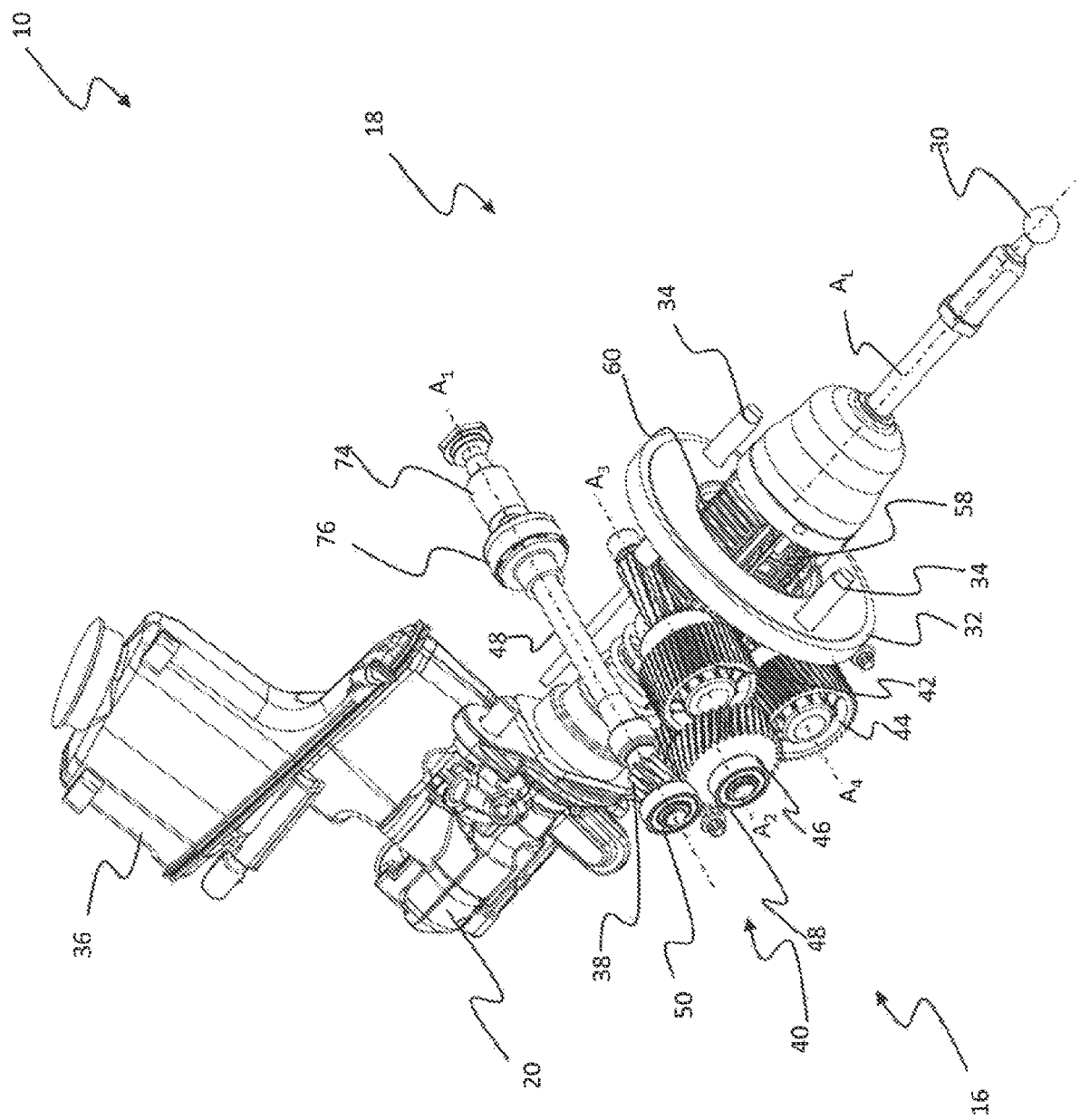
FIG. 19 shows a perspective view of an electromechanical brake booster having a gear mechanism according to the third design variant.

FIG. 19 shows a perspective view of the electromechanical brake booster 10 without motor 12 and without the housing parts 22, 24, 26, 28. The gear mechanism 16 has an intermediate gear 68 in addition to the intermediate gear mechanism stage 40 and the spur gears 42 and 44. The intermediate gear mechanism stage 40 drives the first spur gear 42 directly and the second spur gear 44 via the intermediate gear 68. The spur gears 40 and 42 are connected in torque-transmitting fashion to toothed gears 70. In FIG. 19, only the toothed gear 60 on the first spur gear 38 can be seen. The toothed gears 70 are arranged coaxially with respect to the spur gears 42 and 44. The toothed gears 70 are in engagement with the toothed rack sections 60 on the translationally displaceable actuating element 58 of the actuating device 18. The toothed gears 70 form, together with the toothed rack sections 60, a conversion gear mechanism which converts the rotation of the toothed gears 70 into a translational movement of the actuating element 58 of the actuating device 18.

The motor 12 is, with its housing 22, provided on a different side of the actuating device 18 than the gear mechanism 16. A spring 72 of the actuating device 18 can be seen between the gear mechanism 16, or the toothed gears thereof, and the motor 12.

An output shaft 74 of the motor 12 is coupled by means of a clutch 76 to the input shaft 48 of the gear mechanism 16. The input toothed gear 38 and the bearing 50 are arranged on the input shaft 48. The input toothed gear 38 drives the intermediate gear mechanism stage 40, which drives the first spur gear 42 directly and the second spur gear 44 via the intermediate gear 68. The spur gears 42 and 44 drive the toothed gears 70. The toothed gears 70 engage with the toothed rack sections 60 in order to displace the actuating element 58 of the actuating device 18 in translation for the actuation of the brake cylinder 20.

FIG. 19 illustrates the axes of rotation A1 of the electric motor 12, which corresponds to the axes of rotation of the input shaft 38 of the gear mechanism 16 and of the output shaft 74 of the motor 12, the axis of rotation A2 of the intermediate gear mechanism stage 40, and the axes of rotation A3 and A4 of the spur gears 42 and 44. Also illustrated is the longitudinal axis AL of the actuating device 18. The axes of rotation A1, A2, A3 and A4 extend perpendicular to the longitudinal axis LA of the actuating device 18. The axes of rotation A1, A2, A3 and A4 run parallel to one another.

Figure 20:
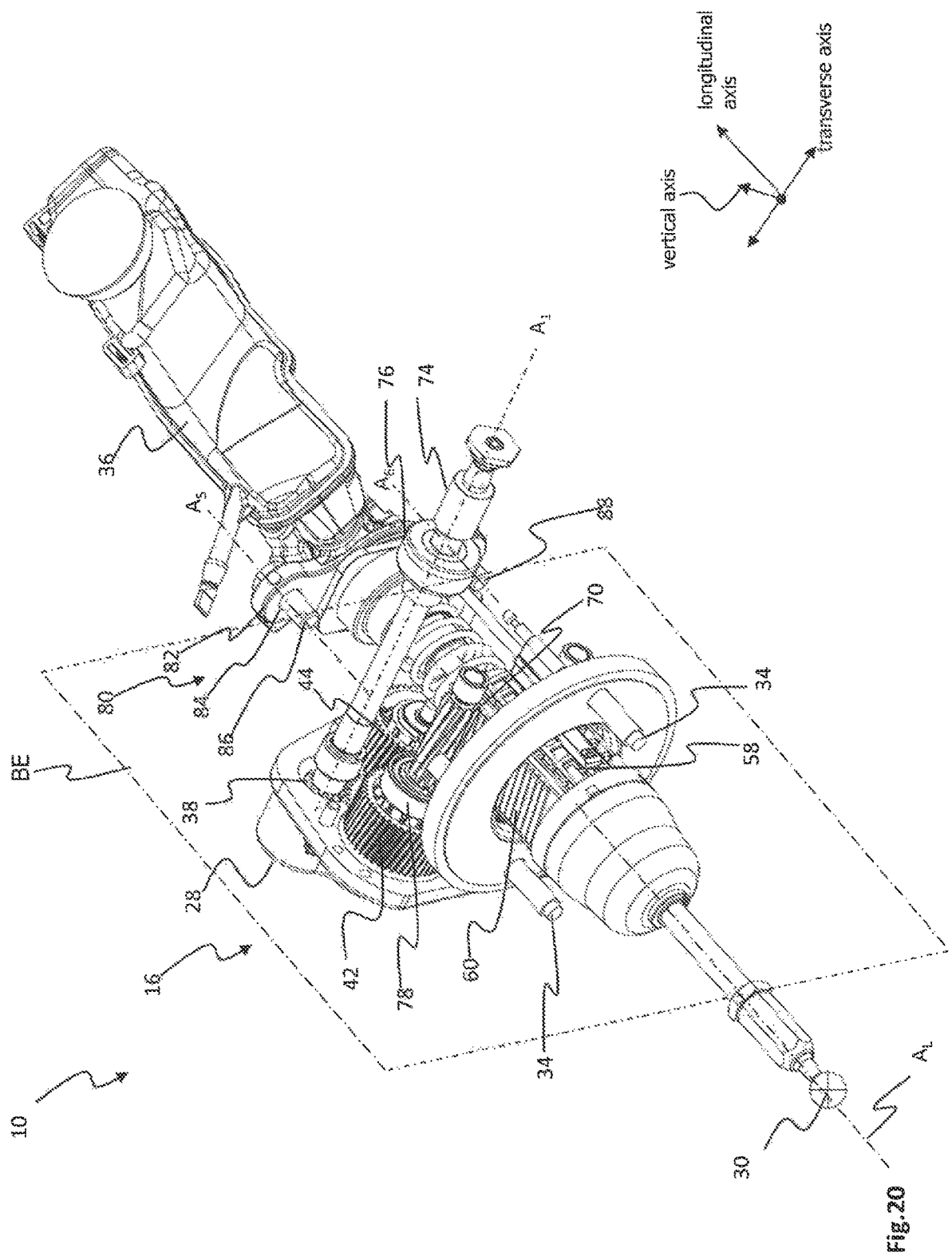
FIG. 20 shows a perspective view of an electromechanical brake booster having a gear mechanism according to the third design variant.

FIG. 20 shows a further perspective view of the electromechanical brake booster 10, in which one of the housing parts assigned to the gear mechanism 16, the housing part 26, is shown. The spur gear 42 is arranged coaxially with respect to the toothed gear 70 and is connected rotationally conjointly to the toothed gear 70. A bearing 78 is provided on the spur gear 42 or on the toothed gear 70. The bearing 78 serves for the mounting of the spur gear 40 with the toothed gear 70 on the housing part 26 (see FIG. 17).

The input shaft 48 of the gear mechanism 16 extends transversely with respect to the longitudinal axis AL of the actuating device 18 the input shaft 48 thus extends from that side of the actuating device 18 on which the gear mechanism 16 is arranged to that side of the actuating device 18 on which the motor 12 is arranged. On that side of the actuating device 18 which has the motor 12, the input shaft 44 is coupled by means of the clutch 76 to the output shaft 74 of the motor 12.

The electromechanical brake booster 10 has a fastening device 80. The fastening device 80 comprises a flange 82 with openings 84 and fastening bolts 86, 88. The fastening bolts 86, 88 are fixedly connected to the assembly or to the flange 82 on the brake cylinder 20. The fastening bolts 86, 88 span a fastening plane BE. The fastening plane BE extends through the central axes A5 and A6 of the fastening bolts 86, 88. The longitudinal axis AL of the actuating device 18 lies in the fastening plane BE. The axis of rotation A1 of the electric motor 12 runs perpendicular to the longitudinal axis AL of the actuating device 18 and of the brake cylinder 20. The axis of rotation A1 of the electric motor 12 runs perpendicular to the fastening plane BE. The same applies to the axis of rotation A2 of the intermediate gear stage 40 and to the axes of rotation A3 and A4 of the spur gears 42, 44 and of the components connected to the spur gears 42, 44. The axis of rotation A1 does not need to run perpendicular to the fastening plane, but may also extend at an angle of 60 to 120° with respect to the fastening plane. The axes of rotation A1, A2, A3 and A4 run parallel to one another but perpendicular to the fastening plane BE and obliquely with respect to the vertical axis of the vehicle. The gear mechanism 16 is arranged on one side of the fastening plane BE and the electric motor (not shown) is arranged on the other side of the fastening plane BE. The arrangement position of the electric motor on the other side of the fastening plane BE is indicated by the output shaft 74 of the motor.

Figure 21:
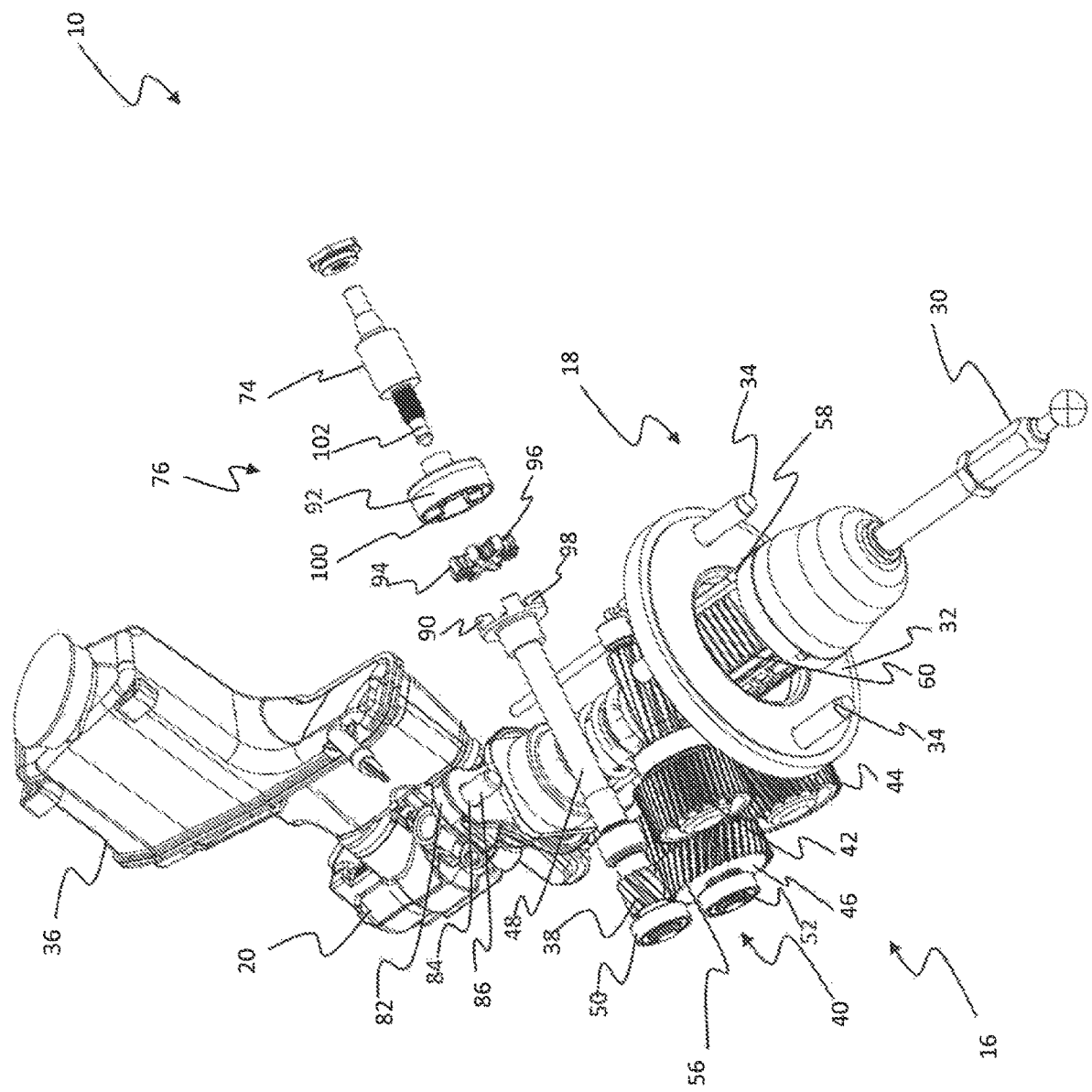
FIG. 21 shows a perspective view of an electromechanical brake booster having a gear mechanism according to the third design variant.

FIG. 21 shows a further perspective view of the electromechanical brake booster 10. By contrast to FIGS. 19 and 20, the clutch 76 is illustrated in the separated state in FIG. 21. A first clutch part 90 is arranged on the input shaft 48 of the gear mechanism 16. A second clutch part 92 is assigned to the output shaft 74 of the motor 12. An intermediate piece 94 is arranged between the first clutch part 90 and the second clutch part 92. The intermediate piece 94 is of substantially stellate form and has a multiplicity of arms 96. Protruding projections 98 are formed on the first clutch part 90. Corresponding projections 100 are formed on the second clutch part 92. The intermediate piece 84 is inserted between the two clutch parts 90 and 92 such that in each case one of the arms 96 of the intermediate piece 94 is arranged between the projections 98 of the clutch part 90 and the projections 100 on the clutch part 92. The intermediate piece 94 may be flexible or elastic in order to be able to prevent damage owing to an overload at the gear mechanism 16 or the electric motor 12. The output shaft 74 of the motor 12 has a centering section 102 which extends through the clutch 76 in the direction of the input shaft 48. In the input shaft 48 there is formed an opening (not shown) which receives the end section of the centering section 102, such that the input shaft 48 and the output shaft 74 are centered relative to one another, and no imbalances can arise.

Figure 22:
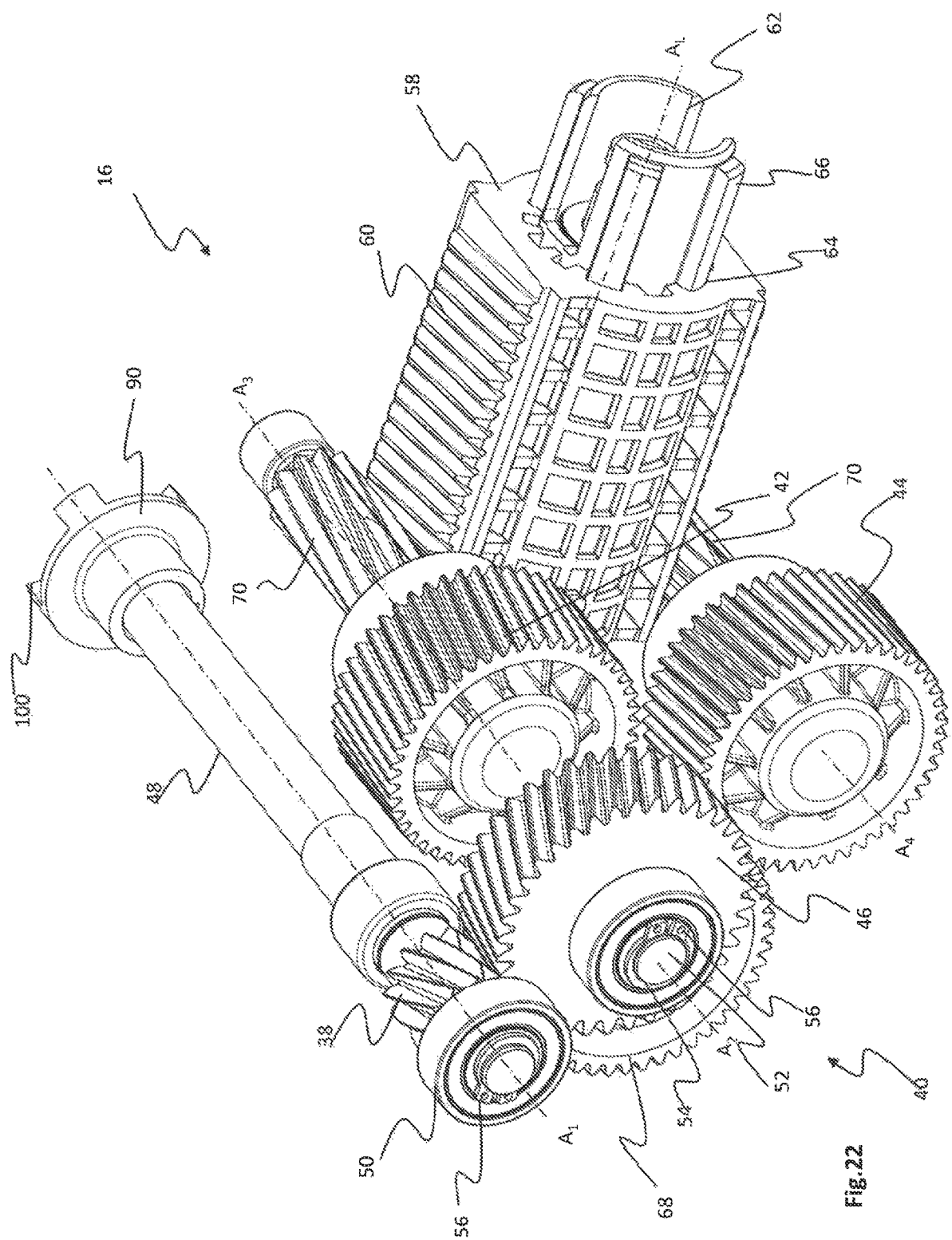
FIG. 22 shows a perspective view of a gear mechanism of the electromechanical brake booster.

FIG. 22 shows a perspective view of the gear mechanism 16. The gear mechanism 16 is driven by means of the input shaft 48, which is driven by the electric motor (not shown). On the input shaft 48, the clutch part 80 with its projections 88 can be seen. The input shaft 48 has the input toothed gear 38. Via the input toothed gear 38, the input shaft 48 drives the first toothed gear 46 of the intermediate gear mechanism stage 40. The first toothed gear 46 drives a second toothed gear (not shown) which is coaxial with respect to the first toothed gear 46. The second toothed gear drives the first spur gear 42 directly and the second spur gear 44 via the intermediate toothed gear (not shown). The spur gears 42 and 44 in turn drive the toothed gears 70, which are coaxial with respect thereto. The toothed gears 70 engage with the toothed rack sections 60 of the actuating element 58. By means of the toothed rack sections 60, the rotational movement of the toothed gears 70 can be converted into a translational movement of the actuating element 58. The actuating element 58 can be displaced in translational fashion relative to the actuating unit 62, in order to actuate the brake cylinder (not shown), by means of the drive via the gear mechanism 16.

Likewise indicated in FIG. 22 are the axes of rotation A1, A2, A3 and A4 of the electric motor (not shown), which correspond to the axis of rotation of the input shaft 38, of the intermediate gear mechanism stage 40 and of the spur gears 42 and 44. The axes of rotation A1, A2, A3 and A4 extend perpendicular to the longitudinal axis AL of the actuating device 18. It can also be seen in FIG. 22 that the toothed gears 70 are arranged coaxially with respect to the spur gears 42 and 44 assigned thereto.

Figure 23:
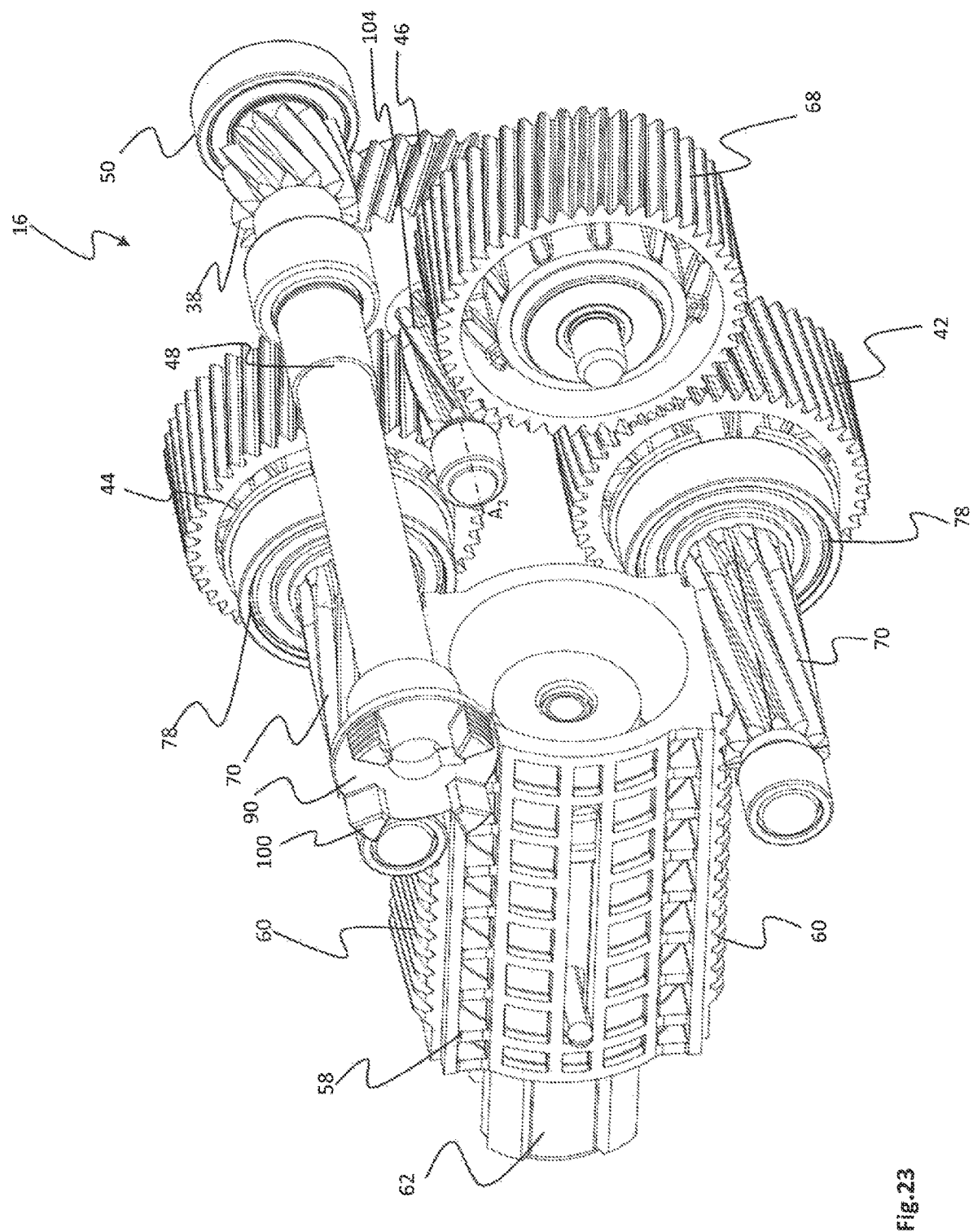
FIG. 23 shows a perspective view of a gear mechanism of the electromechanical brake booster.

FIG. 23 shows a perspective view of the gear mechanism 16 from the direction of the motor (see FIG. 17). Accommodated in the actuating element 58 is the actuating unit 62, by means of which a force exerted on the brake pedal by a driver can be transmitted at least partially to the brake cylinder (not shown). The intermediate gear mechanism stage 40 has a second toothed gear 104 which is coaxial with respect to the first toothed gear 46. By means of the toothed gear 104, the spur gear 42 is driven directly and the spur gear 44 is driven via the intermediate gear 68. The intermediate gear 68 serves for a reversal of a direction of rotation, such that the spur gears 42 and 44 have opposite directions of rotation. Owing to the opposite directions of rotation, the toothed gears 70 on the spur gears 42 and 44 can displace the actuating element 58 in translational fashion. The spur gears 42 and 44 are mounted together with the toothed gears 70 by means of bearing elements 78 in the form of rolling bearings. The toothed gear 104 has a smaller diameter than the toothed gear 46, such that the intermediate gear mechanism stage 40 can provide a speed reduction. The toothed gears 70 likewise have a smaller diameter than the spur gears 42 and 44.

Figure 24:
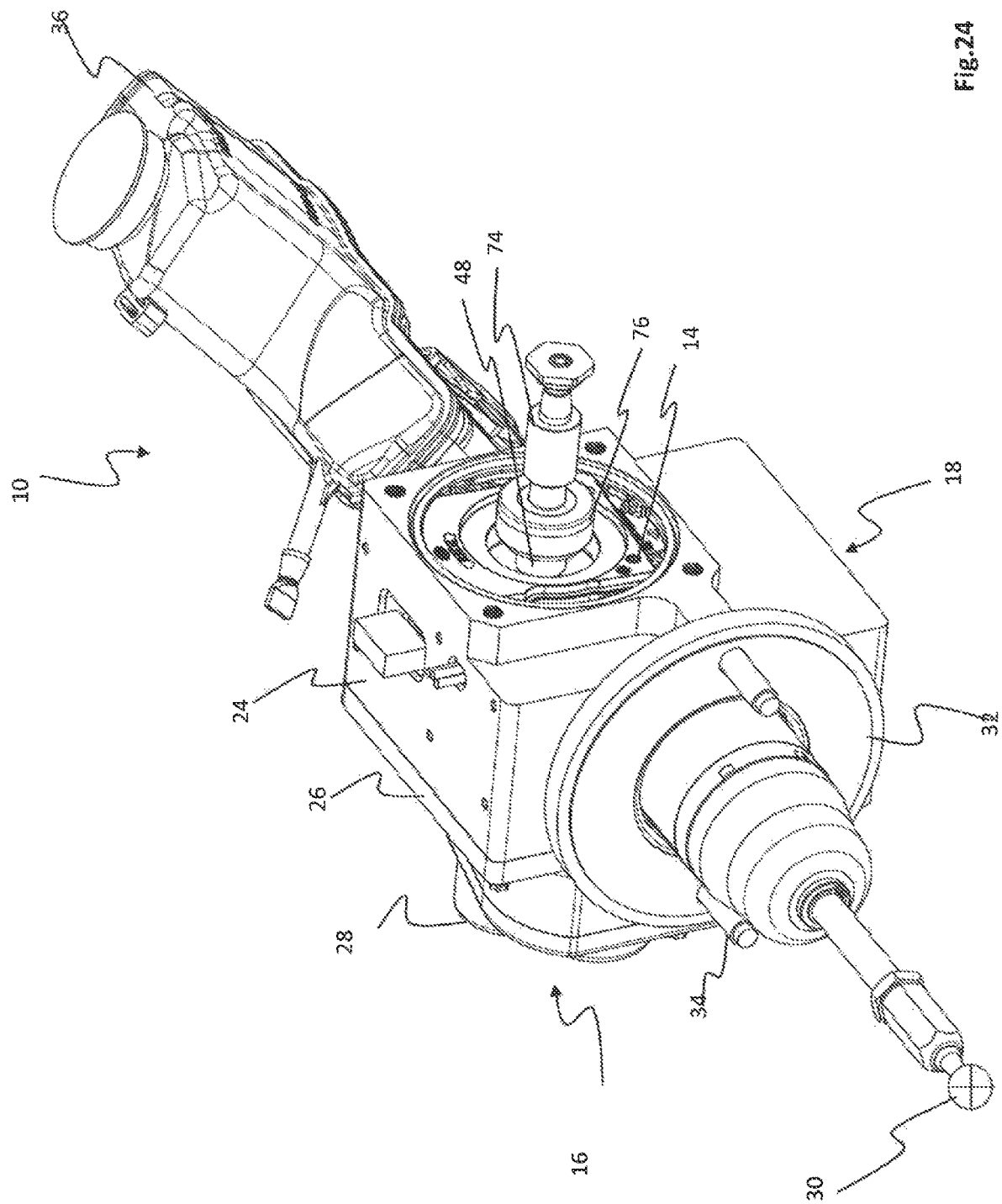
FIG. 24 shows a perspective view of the electromechanical brake booster according to FIGS. 17 to 21 with the electric motor in the fitted state.

FIG. 24 shows a perspective view of the brake booster 10, in which the motor 12 with the housing part 22 assigned thereto has been removed. The output shaft 74 of the electric motor 12 coupled via the clutch 76 to the input shaft 48 of the gear mechanism 16. The motor 12 forms, with its housing 22, a module which is removable from the actuating device 18.

The control unit 14 is accommodated in the housing 24. The control unit 14 is accessible after the motor 12 is dismounted. The control unit 14 is arranged around the input shaft 48 of the gear mechanism 16. In other words, the input shaft 48 extends through an opening in the control unit 14.

Figure 25:
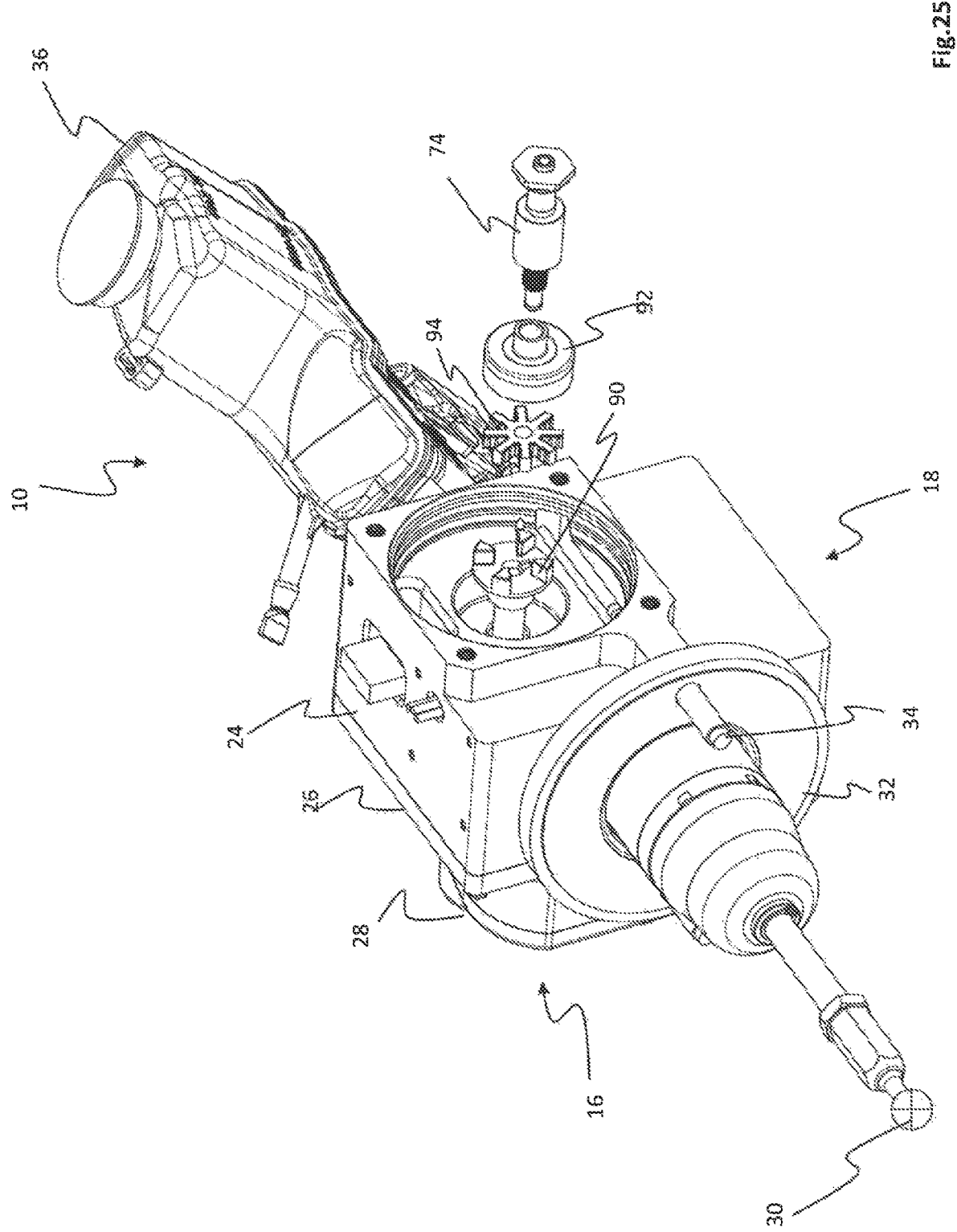
FIG. 25 shows a perspective view of the electromechanical brake booster according to FIGS. 17 to 21 with the electric motor in the removed state.

FIG. 25 shows a perspective view of the electromechanical brake booster 10, in which the control unit 14 has also been dismounted from the brake booster 10. This is confirmed inter alia by the longer section the input shaft 48 of the gear mechanism 16 that is visible in relation to FIG. 13. The input shaft 48 and the clutch parts 90, 92 and the intermediate piece 94 have in each case an opening 106, 108, 110 through which the centering section 102 extends. In order to be able to center the output shaft 74 of the motor 12 and the input shaft 48 of the gear mechanism 16 in order to prevent imbalances, the centering section 102, or the end section thereof, is received in the opening (not shown) in the input shaft 44 of the gear mechanism 16, which adjoins the opening 106 of the clutch part 90.

Various exemplary embodiments with partially differing features have been described. The features of the individual exemplary embodiments may be combined with one another in any desired manner in order to realize an exemplary embodiment which is not illustrated.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An assembly for an electrohydraulic vehicle brake system, the assembly comprising:
a brake cylinder;
an electromechanical brake booster for the electrohydraulic vehicle brake system, the electromechanical brake booster comprising a drive arrangement for driving at least one actuating device to move the brake cylinder, wherein the drive arrangement has an electric motor and a gear mechanism for coupling the electric motor to the at least one actuating device;
at least one fastening device for fastening the assembly to a vehicle, wherein the at least one fastening device defines a fastening plane, wherein the drive arrangement is arranged such that the axis of rotation of the electric motor runs perpendicular to the longitudinal axis of the actuating device and perpendicular to the fastening plane;
wherein an output shaft of the electric motor is coupled to a first spur gear and an intermediate gear via a pinion affixed to the output shaft so that the pinion drives a first second spur gear and the intermediate gear being disposed between the first spur gear and the second spur gear; and
wherein the first spur clear is coupled to the at least one actuating device via a first toothed rack section defined in the at least one actuating device and the second spur pear is coupled to a second toothed rack section defined in the at least one actuating device.

2. The assembly as claimed in claim 1, wherein the drive arrangement has a control unit which is configured for actuating the electric motor.

3. The assembly as claimed in claim 1, wherein the actuating device has at least one first actuating element coupled to a brake pedal, and has at least one second actuating element, which is driven by the electric motor via the gear mechanism, the at least one second actuating element defines the first toothed rack section and the second toothed rack section.

4. The assembly as claimed in claim 1, wherein the longitudinal axis of the at least one actuating device lies (perpendicular to) the fastening plane.

5. The assembly as claimed in claim 2, wherein the gear mechanism, the electric motor and the control unit are arranged together on one side of the fastening plane.

6. The assembly as claimed in claim 2, wherein the electric motor and the control unit are arranaed together on one side of the fastening plane, wherein the gear mechanism is arranged on the other side of the fastening plane.

7. The assembly as claimed in claim 2, wherein the gear mechanism and the control unit are arranged together on one side of the fastening plane, wherein the electric motor is arranged on the other side of the fastening plane.

8. The assembly as claimed in claim 2, wherein the electric motor and the gear mechanism are arranged on one side of the fastening plane, and the control unit is arranged on the other side of the fastening plane.

9. The assembly as claimed in claim 1, wherein the at least one fastening device has fastening means which define the fastening plane.

10. The assembly as claimed in claim 9, wherein the fastening means comprise fastening openings or fastening bolts, the central axes of which span the fastening plane.

11. The assembly as claimed in claim 1,
wherein the first spur gear engages with the pinion on the output shaft of the electric motor so that the pinion directly drives the first spur gear.

12. The assembly as claimed in claim 1, wherein the intermediate gear driven by the pinion of the electric motor is provided for driving the second spur gear.

13. The assembly as claimed in claim 1, wherein the actuating device includes the first and second toothed rack sections which are couplable to wherein the at least one toothed rack section on the actuating device is couplable to the first spur gear and the second spur gear of the gear mechanism via a first roller gear and a second roller gear respectively.

14. The assembly as claimed in claim 1, wherein the gear mechanism furthermore has an intermediate gear mechanism stage which couples the electric motor in torque-transmitting fashion to the first spur gear and to the second spur gear, wherein the intermediate gear mechanism stage drives the first spur gear directly and the second spur gear via the intermediate gear.

15. The assembly as claimed in claim 14, wherein the gear mechanism includes the pinion which is driven by the electric motor, the pinion being configured to drive the first spur gear of the intermediate gear mechanism stage.

16. The assembly as claimed in claim 1, wherein the pinion drives the first spur gear directly and the pinion indirectly drives the second spur gear via the intermediate gear.

17. The assembly as claimed in claim 14, wherein the first spur gear of the intermediate, gear mechanism stage is arranged offset, in the direction of the axis of rotation of the electric motor, with respect to the pinion of the intermediate gear mechanism stage.

18. The assembly as claimed in claim 1, wherein, between the electric motor and the gear mechanism, there is provided a clutch which couples an output shaft of the electric motor to an input shaft of the gear mechanism, wherein the input toothed gear driven by the electric motor is provided on the input shaft of the gear mechanism.

19. The assembly as claimed in claim 1, wherein the electromechanical brake booster has a multi-part housing, wherein the gear mechanism is assigned at least one housing part.

20. The assembly as claimed in claim 19, wherein an input shaft of the gear mechanism is mounted on the housing part.

21. The assembly as claimed in claim 19, wherein an intermediate gear mechanism stage is mounted on the housing part.

22. The assembly as claimed in claim 1, wherein the fastening device is arranged on the brake cylinder or on the electromechanical brake booster.

23. An electrohydraulic motor vehicle brake system comprising:
   an assembly having a brake cylinder and a drive arrangement for driving at least one actuating device to move the brake cylinder, the drive arrangement has an electric motor and a gear mechanism for coupling the electric motor to the at least one actuating device; and
   at least one fastening device for fastening the assembly to a vehicle, wherein the at least one fastening device defines a fastening plane, wherein the drive, arrangement is arranged such that the axis of rotation of the electric motor runs perpendicular to the longitudinal axis of the actuating device and runs perpendicular with respect to the fastening plane;
   wherein an output shaft of the electric motor is coupled to a first spur gear and an intermediate gear via a pinion affixed to the output shaft so that the pinion drives a first spur gear and an intermediate gear, the intermediate gear being configured to drive a second spur gear and the intermediate gear being disposed between the first spur gear and the second spur gear; and
   wherein the first spur gear is coupled to the at least one actuating device via a first toothed rack section defined in the at least one actuating device and the second sour gear is coupled to a second toothed rack section also defined in the at least one actuating device.

* * * * *